United States Patent
Haneda et al.

(10) Patent No.: US 10,860,890 B2
(45) Date of Patent: Dec. 8, 2020

(54) LEARNING MANAGEMENT DEVICE, LEARNING MANAGEMENT METHOD, AND IMAGING DEVICE

(71) Applicant: Olympus Corporation, Hachioji (JP)

(72) Inventors: Kazuhiro Haneda, Hachioji (JP); Dai Ito, Hamura (JP); Zhen Li, Hachioji (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 79 days.

(21) Appl. No.: 16/283,710

(22) Filed: Feb. 22, 2019

(65) Prior Publication Data
US 2019/0370602 A1 Dec. 5, 2019

(30) Foreign Application Priority Data

Jun. 4, 2018 (JP) .................................. 2018-106988

(51) Int. Cl.
*G06K 9/62* (2006.01)
*G06N 20/00* (2019.01)
*G06N 5/04* (2006.01)

(52) U.S. Cl.
CPC ............. *G06K 9/6256* (2013.01); *G06N 5/04* (2013.01); *G06N 20/00* (2019.01)

(58) Field of Classification Search
CPC .. G06K 9/6256; G06K 9/6264; G06K 9/6273; G06N 20/00; G06N 5/04; G06N 3/08
See application file for complete search history.

(56) References Cited

U.S. PATENT DOCUMENTS 10,325,179 B1 * 6/2019 Kim ...................... G06N 3/08
2016/0132789 A1 * 5/2016 Flinn ..................... G06N 5/048
706/14
2017/0124432 A1 * 5/2017 Chen ...................... G06F 40/30

FOREIGN PATENT DOCUMENTS

JP 2015-173307 10/2015

OTHER PUBLICATIONS

JP 2018-154028; Tanaka et al., Inference|deduction apparatus used for a vehicle for photographing a driver, which has first model for deducing intermediate data from input data, and first model learned considering input data and intermediate data as teacher data, Aug. 20, 2018; Denso IT Lab; (Year: 2018).*

* cited by examiner

*Primary Examiner* — Neil R McLean
(74) *Attorney, Agent, or Firm* — John C. Pokotylo; Pokotylo Patent Services

(57) ABSTRACT

A learning management device comprising an inference engine that is input with image data and acquires output for performing guidance display to a user using an inference model that has been specifically learned, and a processor that confirms if there is a specified relationship between a trial input image and trial guidance display for this trial input image under conditions that have been assumed at the time of use, and that determines whether or not it is necessary to relearn the inference model that has been learned based on the result of this confirmation.

21 Claims, 19 Drawing Sheets

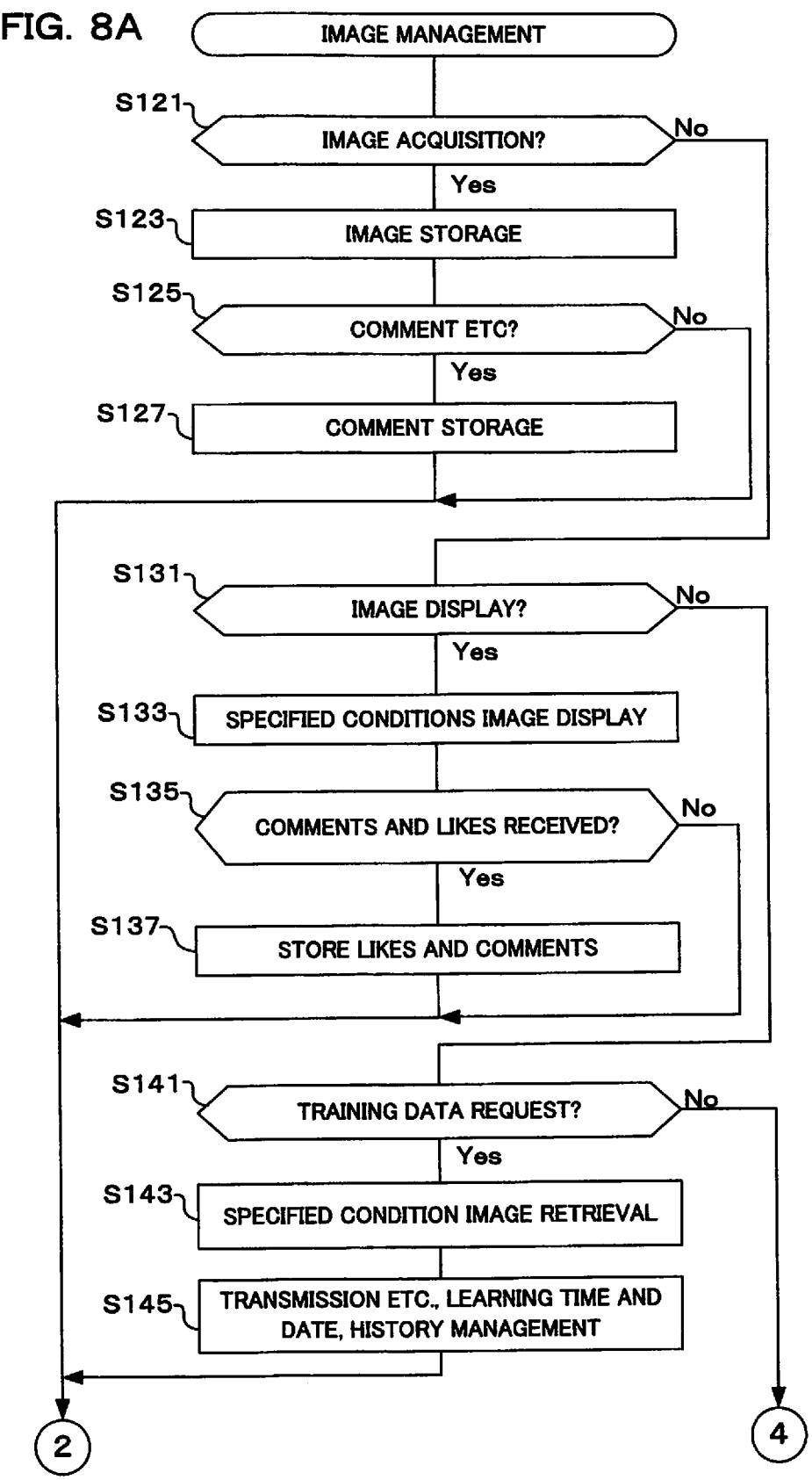

LEARNING MANAGEMENT DEVICE, LEARNING MANAGEMENT METHOD, AND IMAGING DEVICE

CROSS-REFERENCE TO RELATED APPLICATIONS

Benefit is claimed, under 35 U.S.C. § 119, to the filing date of prior Japanese Patent Application No. 2018-106988 filed on Jun. 4, 2018. This application is expressly incorporated herein by reference. The scope of the present invention is not limited to any requirements of the specific embodiments described in the application.

BACKGROUND OF THE INVENTION

1. Field of the Invention

The present invention relates to a learning management device, a learning management method and an imaging device that, in an inference device that performs inference using inference models that have been generated in a learning device, confirm if an inference model is appropriate.

2. Description of the Related Art

In recent years there have been advances in the use of deep learning, and analysis of images using deep learning inference models has been proposed (refer to Japanese patent laid open number 2017-091525 (hereafter referred to as "patent publication 1")). Specifically, there have been various proposals for making image data into a population (training data), generating an inference model using deep learning, and performing guidance etc. by performing analysis of input images etc. using this inference model. It has also been proposed to change image data in accordance with conditions (refer to Japanese patent laid-open No. 2015-173307 (hereafter referred to as "patent publication 2")).

As has been described above, there have been various proposals for inputting images, and performing guidance etc. by performing inference using inference models. However, there are cases where conditions etc. change after an inference model has been generated and it is not possible to perform appropriate guidance etc. However, in the past no consideration has been given to conditions changing after inference model generation.

SUMMARY OF THE INVENTION

The present invention provides a learning management device, a learning management method and an imaging device that confirm whether or not an inference model is appropriate, even if there is change in conditions etc.

A learning management device of a first aspect of the present invention comprises an inference engine that is input with image data and acquires output for performing guidance display to a user using an inference model that has been specifically learned, and a processor that confirms if there is a specified relationship between a trial input image and trial guidance display for this trial input image under conditions that have been assumed at the time of use, and that determines whether or not it is necessary to relearn the inference model that has been learned based on the result of this confirmation.

A learning management method of a second aspect of the present invention comprises, setting an inference model in an inference engine, inputting image data and acquiring output for performing guidance display to a user using an inference model that has been specifically learned, and confirming if there is a specified relationship between a trial input image and trial guidance display for this trial input image under conditions that have been assumed at the time of use, and determining whether or not it is necessary to relearn the inference model that has been learned based on the result of this confirmation.

An imaging device of a third aspect of the present invention comprises an imaging section that forms a subject image and outputs image data, an interface that is input with an inference model, an inference engine that is input with image data and acquires output for performing guidance display to a user using the inference model, a display that performs the guidance display based on output of the inference section, and a processor that confirms update of the inference model, and based on a result of this confirmation, requests update of the inference model to an external learning device, or requests determination as to whether or not update of the inference model is required.

BRIEF DESCRIPTION OF THE DRAWINGS

FIG. 8A and FIG. 8B are flowcharts showing operation of image management in the learning system of the second embodiment of the present invention.

DETAILED DESCRIPTION OF THE PREFERRED EMBODIMENTS

In the following, an example applied to a learning management system, as a first embodiment of the present invention, will be described using FIG. 1A to FIG. 4. An inference model that has been acquired by machine learning, or an inference engine that uses this inference model, have been obtained by learning based on previous learning results, regardless of whether or not there is training data. Therefore, since there is a possibility of performing unforeseen inference due to the fact that there are differences between previous and current conditions, or differences in conditions between an assumed scene and a scene that is actually used, it is preferable to perform appropriate maintenance. With this embodiment, optimum inference is made possible while performing appropriate maintenance assuming such conditions.

Figure 1A:
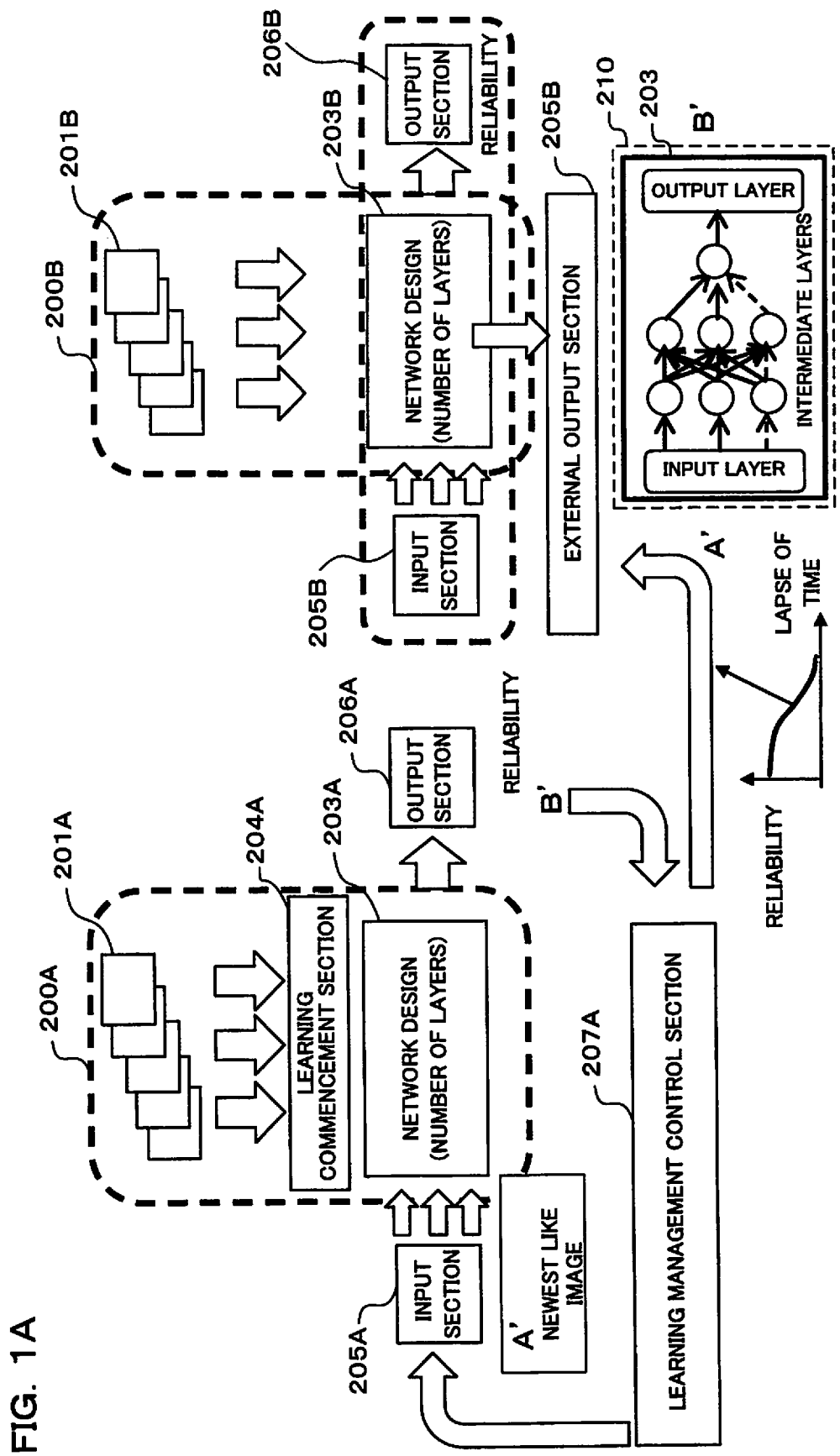
FIG. 1A is a block diagram showing overall structure of a learning management system for a concept that is common to all of the embodiments of the present invention, and a learning management method.

FIG. 1A represents a concept that is common to all of the embodiments, and shows a configuration for generating an inference model in a learning device. This learning device works in collaboration with a social network system, for example, and assumes an environment such as where a third party writes quality assessment (not necessarily limited to subjective evaluation) such as "like" to a contents item or the like (user contributed photograph or blog etc.) that has been posted on the social network. In such an environment, among contents items that have been posted, specified contents items to which quality assessment information has been attached can be used as training data at the time of inference as to what type of contents items receive what type of evaluation. In order to achieve this, contents items on the evaluation results for those contents items should be acquired from a social network. Accordingly, using training data that has been acquired it is possible to perform machine learning in order to infer relationships between characteristics and quality assessment of contents items using a computer etc. As a result of performing inference using an inference model that has been acquired by this machine learning, it becomes possible to predict what type of evaluation contents items that will be posted in the future will receive.

With the above described social network system there is a possibility of content items sometimes being contributed and posted, and posted content items have a possibility of being subjected to quality assessment by users (including preferences) of the social network system. This means that there are cases where follower inclination changes in accordance with entry of new innovative content items, new evaluators joining, and also opinion leaders joining. Since these types of conditions change with time, an inference model will become obsolete. For example, there may also be cases where old data will be learned even though conditions have changed. In this case, training data will be a data set (old data set) that is already obsolete.

In FIG. 1A, learning of an inference engine 203A (design of a network (number of layers)) is performed in learning device A using an old data set 201A that is made up of data sets A and B as training data, and an inference model is generated. Specifically, the old data set 201A is training data that is made up of a combination of input data (image data or the like) and output results. A learning commencement section 204A executes learning in the inference engine 203A when input data (image data etc.) for training data has been input to the inference engine 203A, so as to correspond to output results of the training data. The inference model has results of having executed this learning, and has strength and weightings of connections of neurons within the inference engine 203A. It should be noted that the structure of the inference engine 203A will be described later using FIG. 1B.

After the inference model has been generated, the inference engine 203A is input with input data such as image data from an input section 205A, and outputs inference results to an output section 206A. A learning management control section 207A determines reliability of the inference results. This inference results reliability gradually decreases as time passes, as shown in the graph at the lower right of FIG. 1A. If the old data set 201A becomes obsolete, there are cases where speed of this decrease becomes unexpectedly larger.

For example, assuming that an inference model has been generated using image data, that has been evaluated as "like", as the old data set 201A. In this case, if image data is input to the input section 205A, the inference engine 203A can perform guidance so that it is possible to shoot an image that will be evaluated as "like". However, if an evaluator's preference for images that have been uploaded to the Internet has changed after the inference model was generated, then with an inference model that was generated using the old data set 201A there will be cases where it becomes no longer possible to shoot an image that will be evaluated. In this case, even if a newest "like" image A' is input it will not be evaluated as "like", and the reliability B' is lowered. In order to clearly explain the preferred line of thinking of this application, an example is given for verifying whether an inference engine performs as anticipated by applying inputs that have matched a practically used situation such as using a newest "like" image.

That is, an inference model that has been acquired by machine learning, or an inference engine that uses an inference model, has been obtained by learning based on previous learning results, regardless of whether or not there is training data. Therefore, there is a possibility of performing unforeseen inference due to the fact that there are differences between previous and current conditions, or differences in conditions between an assumed scene and a scene that is actually used. It is therefore preferable to perform appropriate maintenance. Assuming such conditions, whether or not realistically anticipated results are output is monitored, and depending on the result of this monitoring appropriate maintenance is commenced.

That is, for conditions that have been assumed at the time of use of a specified inference model that has already been learned, a processor that is capable of managing image data transitions inputs trial input images to the specified inference model that has already been learned, confirms whether or not output of the specified inference model that has already been learned will constitute specified guidance display for the trial input images, and determines whether or not it is necessary to update and learn the inference model that has already been learned (are relearned using new training data). A server that manages image groups as a database may have such a processor, and the processor may perform the determination at specified times, and may perform receipt of requests from external units. Alternatively, the processor may also be mounted in another server and device collaborating with an image management server. Alternatively, the processor may have a device that outputs guidance display built in, and may have a structure whereby the same functions are incorporated in cooperation by means of communication etc.

A learning management section 207A changes learning data to a new data set 201B for the learning device B (in FIG. 1A the hardware of A and B may be the same, but shown as B for ease of understanding) if the reliability is lowered. The inference engine 203B performs learning and regenerates an inference model, with this data set 201B as training data. This inference model that has been relearned is output from an external output section 205B, and is input to an inference engine 203 inside an external image acquisition device 210 etc. By using the inference model that has been relearned, it is possible to keep reliability of the inference results at a constant level.

Figure 1B:
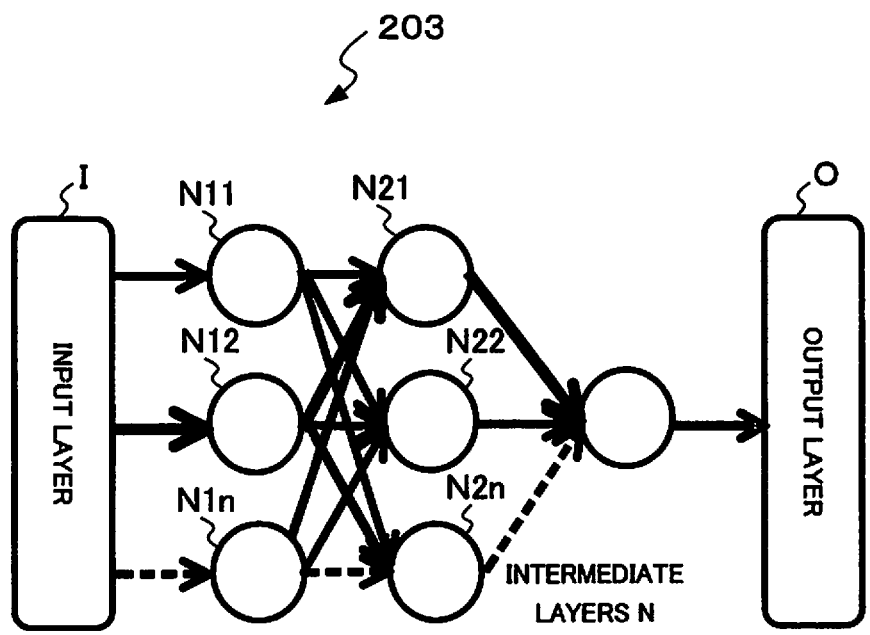
FIG. 1B is a block diagram showing a structure for inference model formation in a learning system of a concept that is common to all embodiments of the present invention.

Next, using FIG. 1B, the structure of the inference engines 203A and 203B that perform the previously described deep learning will be described using the inference engine 203. FIG. 1B shows an exemplary structural example of an inference engine resulting from learning, that can be used in FIG. 1A where the concept that is common to all embodiments has been assumed. This inference engine 203 has intermediate layers (neurons) arranged between an input layer I and an output layer O. As these intermediate layers, a number of neurons N11 to N1$n$, N21 to N2$n$, . . . , are arranged. The number of neuron layers is appropriately determined according to the design, and a number of neurons in each layer is also determined appropriately in accordance with the design. It should be noted that the inference engines 203A, 203B and 203 may be chips that have been constructed with hardware circuits, and may also be implemented using software.

If deep learning is performed, input data such as image data within training data is input to the input layer I, and correct solutions within training data are provided at the output layer O. When image data has been input to the input layer I, strengths (weights) between respective neurons are determined by respective learning such that correct solutions are output from the output layer O. As an inference model, each neuron, and strength (weight) of connection between each neuron, that have been obtained by learning, are output. It should be noted that image data input to the input layer I is narrowed down to groups of image data in accordance with specified conditions, and as correct solution data of the output layer O, high evaluations from a third party ("like" evaluation) may be supplied.

Next, using FIG. 2A and FIG. 2B, operation in the case of acquiring images with an industrial endoscope, as an image acquisition device, will be described. First, an example of an environment of giving evaluations in a social network system will be described. However, this application is not limited to this system, and this is only an example, and the invention of this application can also be implemented in a different environment. An inference engine becoming obsolete over time involves not only third party evaluations, and there may also be cases where design or materials of a physical object to be examined change depending on the period. This is because with a machine for implementing examination also there are model changes, minor changes, changes to accessories that can be used, and changes due to generation, such as the habits of people using a system.

Figure 2A:
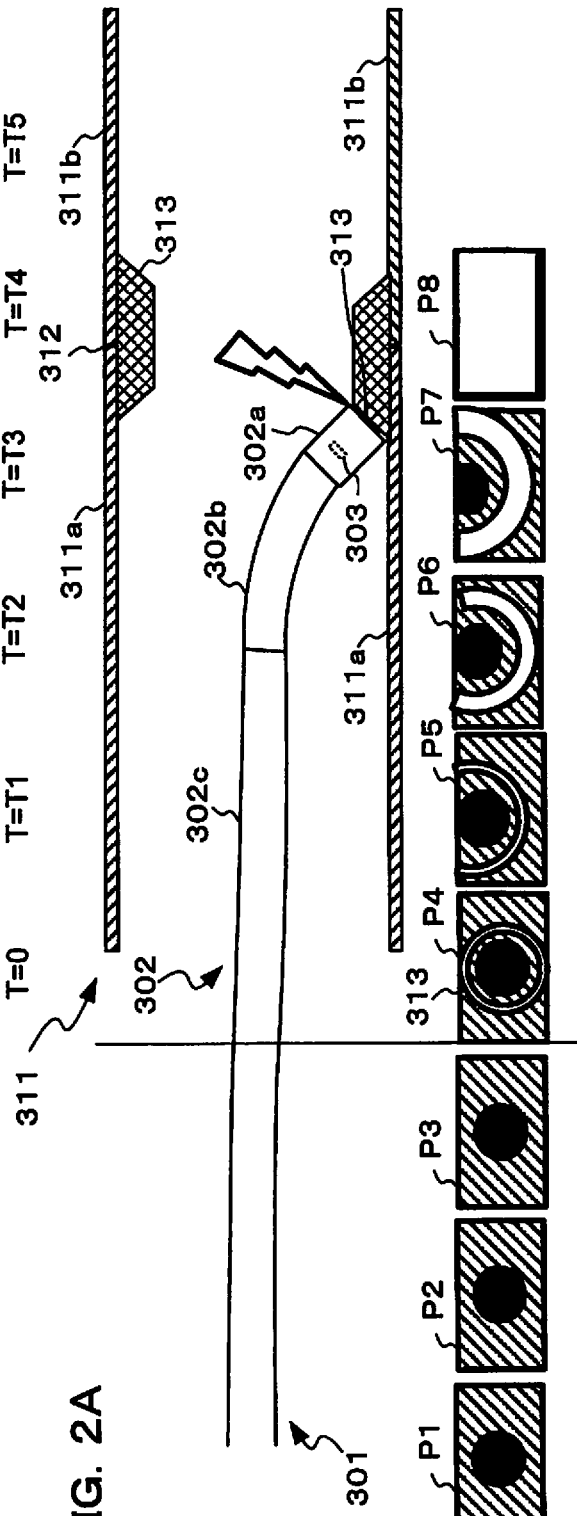
FIG. 2A and FIG. 2B are drawings showing image change when an industrial endoscope is inserted into a physical object to be examined, in a case where the learning management system of a first embodiment of the present invention has been applied to an industrial endoscope.
Figure 2B:
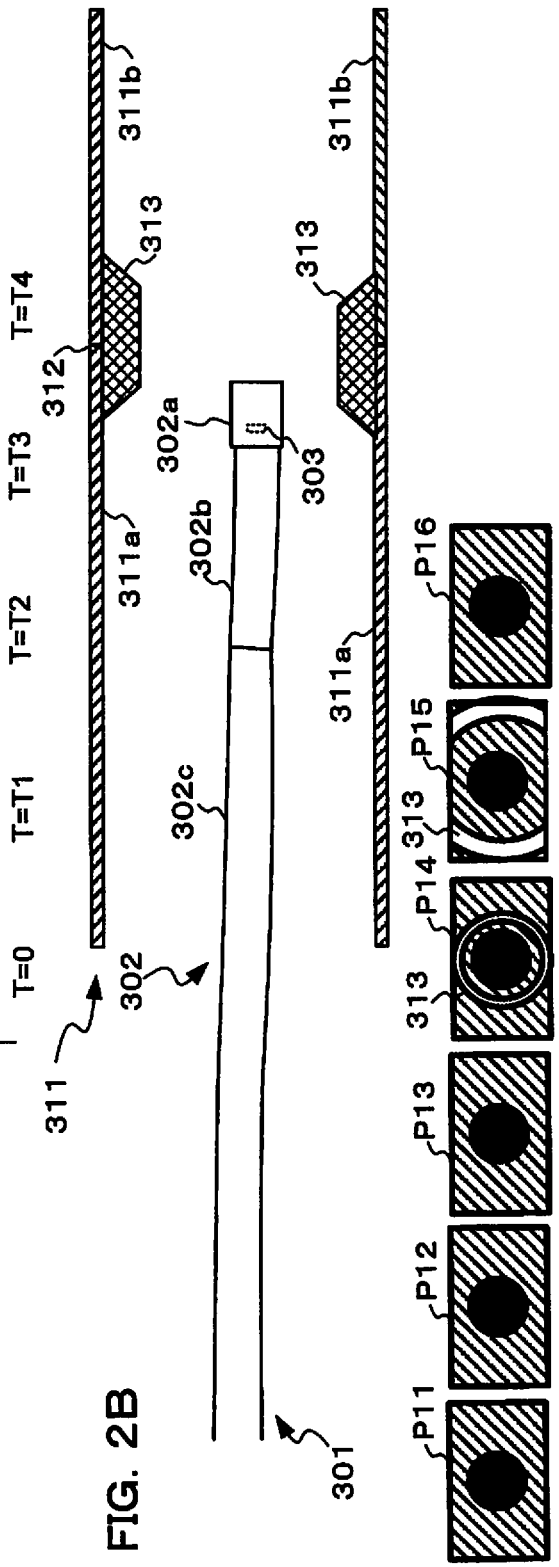

FIG. 2A and FIG. 2B show an example of training images in a case where this embodiment has been applied to an industrial endoscope 301 for observing the inside of a pipe 311. FIG. 2A shows a state where the industrial endoscope 301 has been inserted into the pipe 311 and has collided with the pipe wall, while FIG. 2B shows a state where the industrial endoscope 301 has been inserted into the pipe 311 and is advancing straight forward.

An insertion section 302 of the industrial endoscope 301 is flexible and tubular. The insertion section 302 has, in order from that tip end, a tip section 302$a$, a bending section 302$b$, and a flexible tube section 302$c$. The bending section 302$b$ has, for example, a plurality of bending pieces, that are not illustrated. The bending section 302$b$ is freely curved, and can be bent in any direction by remote operation by the user. An image sensor such as a not shown CCD (Charge Coupled Device image sensor or CMOS (Complementary Metal Oxide Semiconductor) image sensor and an imaging section 303 having lighting sections, not shown, are provided on the tip section 302$a$.

The pipe 311 is made up of two pipes, a pipe 311$a$ and a pipe 311$b$, with the pipe 311$a$ and the pipe 311$b$ being joined by a joint 312. In the example shown in FIG. 2A and FIG. 2B, ring-shaped rust 313 arises inside the joint 312, and protrudes toward the inside.

FIG. 2A and FIG. 2B show the appearance of the insertion section 302 of the industrial endoscope 301 having been inserted into the pipe 311 in order to observe the condition of the rust 313. FIG. 2A shows a case where the tip section 302$a$ of the insertion section 302 cannot be moved adeptly to an observation position for the rust 313 and has collided with the pipe wall. On the other hand FIG. 2B shows a case where the tip section 302$a$ of the insertion section 302 advances forward within the pipe, and can be moved adeptly.

Images P1 to P8 shown at the lower part of FIG. 2A show images that have been acquired by the imaging section 303 of the industrial endoscope 301. Images P1 to P3 are images close to the entrance of the pipe 311, and the far end of the pipe is black (refer to the black circles). Image P4 is an image that has been acquired at time T0, and rust 313 can be seen outside the black circle representing the far end.

At time T1 the tip section 302$a$ of the insertion section 302 is moved downwards, and if it is then moved forward in this condition (images T1 to T3, images P5 to P7) the tip will finally collide with the rust 313 (time T4, image P8). In this case, it is not possible to observe the rust 313 from above.

In FIG. 2B images acquired before time T0 are the same as for the case of FIG. 2A. At time T1, the tip section 302$a$ advances into the pipe 311, and since it has passed the vicinity just above the rust 313 the center of the image becomes dark while outside the center the rust 313 can be seen in a circular shape. further, at time T2 the tip section 302$a$ passes above the rust 313 and so the rust 313 can no longer be seen and the center of the image is only dark.

In this way, in a case where the industrial endoscope 301 has been inserted into the pipe 311 and the inside is observed, if not operated appropriately the collision etc. with the pipe wall will occur, as shown in FIG. 2A, and it will not be possible to observe the inside. However, as was explained using FIG. 1A, by generating an inference model for an inference engine using image data for training, it becomes possible to perform guidance display.

While using the industrial endoscope 301 there is change to the inside of the pipe 311, or the imaging section or insertion section of the industrial endoscope 301 have been updated, and reliability of the guidance display using an inference model is lowered. With this embodiment therefore, in cases such as when reliability has been lowered, the learning management control section 207A requests update of the inference model to a learning device, using new training data.

Figure 3:
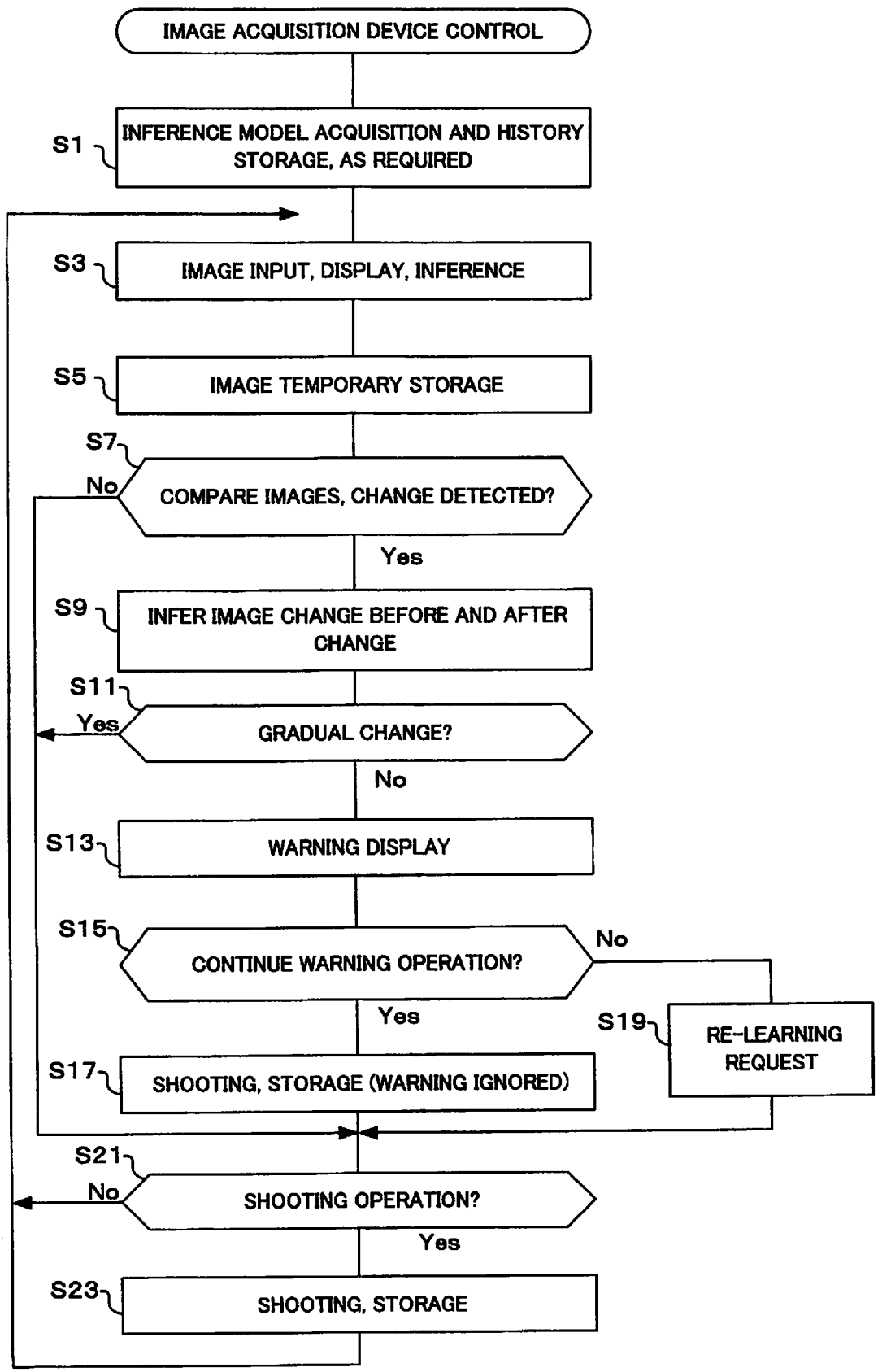
FIG. 3 is a flowchart showing control operation of an image acquisition device, in the learning management system of the first embodiment of the present invention.

Next, operation of the learning management system of a first embodiment will be described using the flowcharts shown in FIG. 3 and FIG. 4. The flowchart shown in FIG. 3 shows control operation for the image acquisition device 210. The image acquisition device 210 shown in this flowchart is an example of having been applied to an industrial endoscope 301 such as shown in FIG. 2A and FIG. 2B.

If the flow shown in FIG. 3 is commenced, first an inference model is acquired and history is stored, as required (S1). Here, an inference model used by the inference engine 203 of the image acquisition device 210 is acquired, as required (referred to S47 in FIG. 4). If an inference model has already been acquired, or if an inference model has been acquired and update is not necessary, acquisition processing is not performed. Also, as history, in a case where an inference model has been acquired, history such as acquisition date, type of device used, inference model version, inference model purpose, physical object of inference model, conditions in which the inference model is effective etc. are stored.

Next, images are input and displayed, and inference is performed (S3). Here, image data is input by the imaging section 303, and display is performed on the display section of the industrial endoscope 301 on the basis of this image data. The user can observe the appearance inside the pipe 311 using this display. Inference for guidance display is also performed using the inference engine 203.

Next, images are temporarily stored (S5). Here, images that were acquired in step S3 are temporarily stored in memory within the industrial and scope 301. In steps S7, S9 etc. that will be described later, inference is performed based on changes to these images that have been temporarily stored.

If temporary storage of the images has been performed, next images are compared, and it is determined whether or not change has been detected (S7). Here, a most recent temporarily stored image and an image temporarily stored before that are compared. Whether or not an image has changed is determined based on the comparison result. For example, in FIG. 2A, there is no change between images P1 to P3, while there is change between images P3 and P4, and similarly images also change between images P4 and P5, P5 and P6, . . . .

If the result of determination in step S7 is that change has been detected, inference is performed using changes in images before and after change (S9). Here, a change component for images before change and after change are input to the inference engine 203, and inference results are obtained. For example, in a case where the tip section 302a of the insertion section 302 is moving, as shown in FIG. 2A, if the images change, such as shown in P4 to P5, and P5 to P6, it can be inferred that there will be collision with the pipe wall. On the other hand, in a case where the tip section 302a of the insertion section 302 is moving as shown in FIG. 2B, if the images change, such as shown in P14 to P15, and P15 to P16, it can be inferred that there will not be collision with the pipe wall and the tip section 302a will be moved forward. Once inference has been performed based on image change, guidance is displayed based on the inference results.

It is then determined whether or not change is smooth (S11). In this step, whether or not there is gradual change is determined based on the inference results of step S9. For example, in a case such as shown in images P4 to P8 in FIG. 2A, it is inferred that there will be collision with the pipe wall, and in this type of case it will not be determined that change is smooth On the other hand, in a case where it is inferred that the tip of the endoscope will be moved forward within the pipe, such as shown in images P11 to P16 in FIG. 2B, it will be determined that change is smooth.

If the result of determination in step S11 is that there is not a gradual change, then warning is performed (S13), and here, since there is not gradual change, warning display is performed advising the user to perform operation carefully. If warning display has been performed, it is next determined whether or not the user is continuing the operation the warning relates to (S15). In this step, it is determined whether or not an operation that has been performed by the user is continuing unchanged even though there is warning display, and there is the same problem (for example, collision etc.).

If the result of determination in step S15 is that the operation is continuing, shooting is performed and the fact that the warning has been ignored is stored (S17). As a result of the user wrongly continuing operation even though warning display has been performed, there may be cases where the device or a physical object will be damaged. Therefore, in this step, shooting is performed and the fact that the warning has been ignored is stored in order to record where responsibility for that action lies as evidence.

On the other hand, if the result of determination in step S15 is that the operation is not continuing, relearning is requested (S19). If the warning has not been ignored and the user has changed their operation, there is a possibility that the inference model will no longer match the current situation. For example, various situations can be considered where the inference model may not be suitable, such as in a case where the imaging section 303 of the industrial endoscope has been replaced, a case where material of the insertion section 302 is different, or a case where conditions inside the pipe 311 have changed considerably. In this type of case relearning is requested to the learning device in order to update the inference model (refer to S31 in FIG. 4).

If the fact that the warning was ignored is stored in step S17, or if relearning was requested in step S19, or if the result of determination in step S7 was that there was no image change, or if images changed smoothly, it is next determined whether or not a shooting operation has been performed (S21). Here it is determined whether or not an operation has been performed in order to acquire a still image (or movie image) using the imaging section 303. If the result of this determination is that a shooting operation has not been performed, processing returns to step S3.

If the result of determination in step S21 is that a shooting operation has been performed, shooting is performed and storage is performed (S23). Here, image data is acquired using the imaging section 303, and after image processing has been applied to this image data, the image data is stored in storage medium or the like. Once the image data has been stored, processing returns to step S3.

Next, operation for inference model acquisition will be described using the flowchart shown in FIG. 4. This inference model acquisition is realized by a processor, such as a CPU (Central Processing Unit) within the learning management control section 207A of the learning device controlling each section within the learning device in accordance with programs that have been stored in a storage section.

Figure 4:
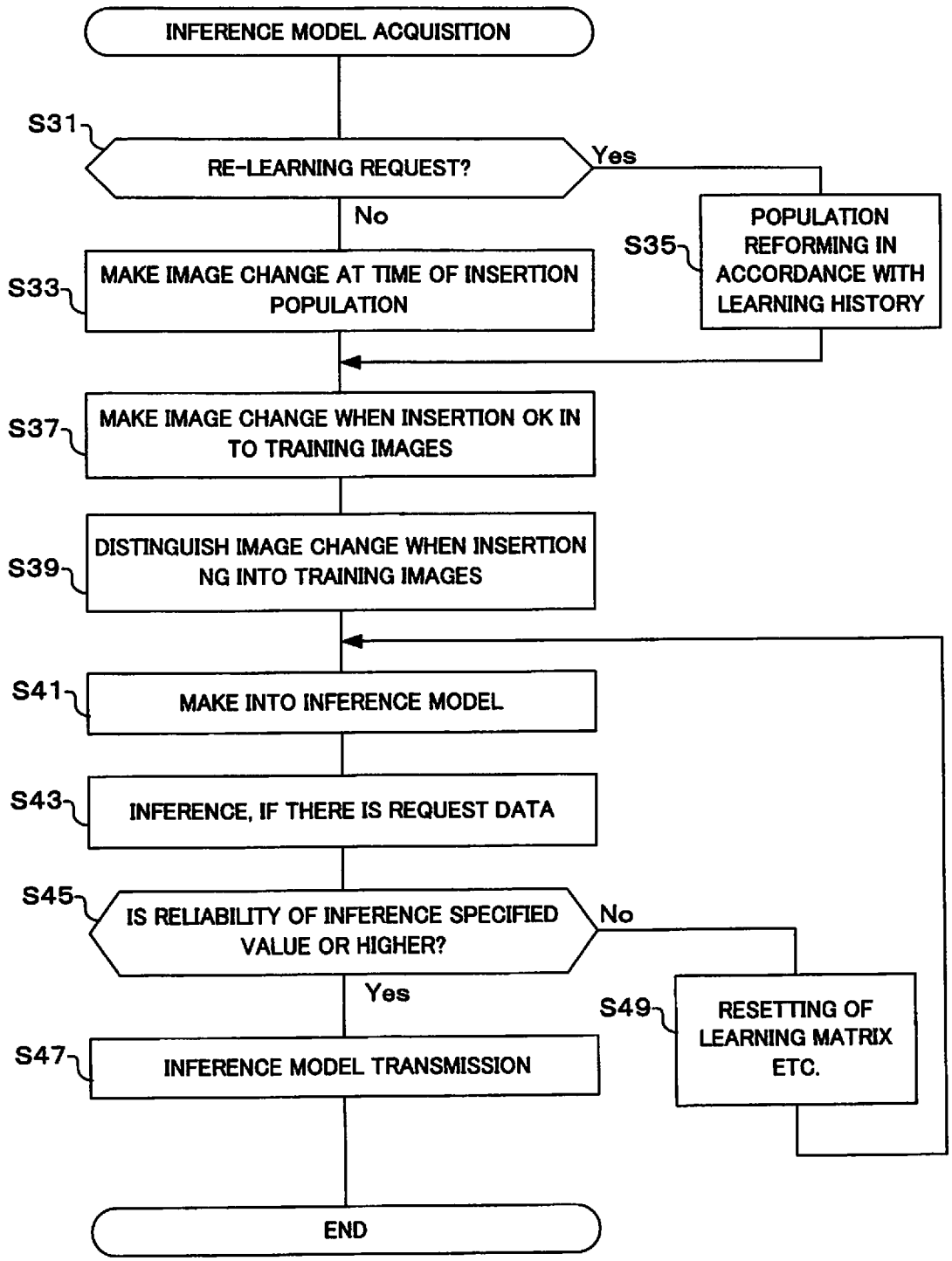
FIG. 4 is a flowchart showing an inference model acquisition operation, in the learning management system of the first embodiment of the present invention.
Figure 5:
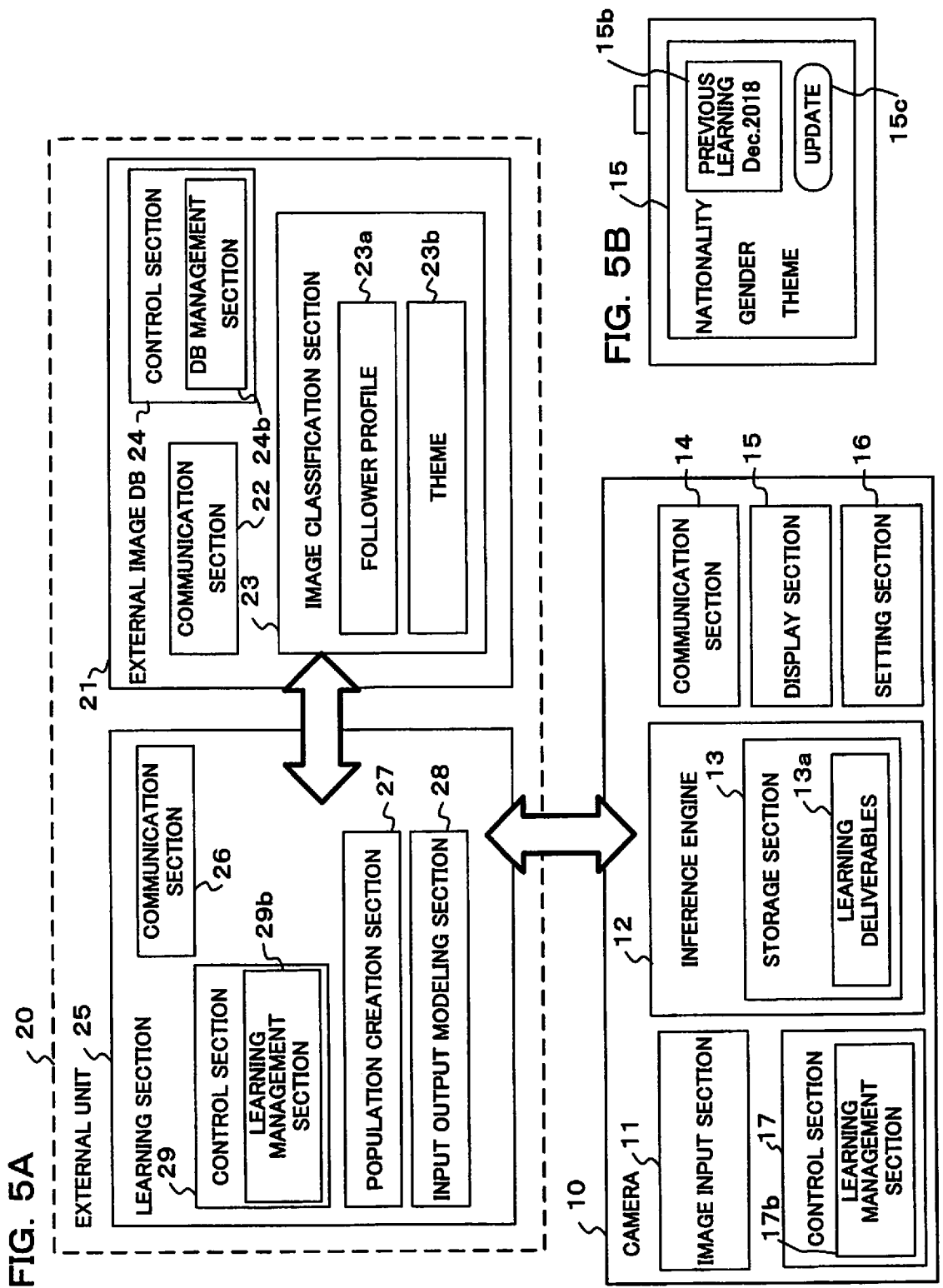
FIG. 5A and FIG. 5B are block diagrams mainly showing the electrical structure of a learning system of a second embodiment of the present invention.

If the flow for inference model acquisition shown in FIG. 4 is commenced, it is first determined whether or not there is a relearning request (S31). As was described previously, if a condition where reliability of an inference model is lowered comes about, the image acquisition device 210 requests creation of a new inference model by performing relearning in the learning device, by means of a communication section (refer to S19 in FIG. 3). In this step it is determined whether or not there has been a request for relearning from the image acquisition device.

If the result of determination in step S31 is that there is not a request for relearning, image changes at the time of insertion are made into a population (S33). Here, changes to images at the time of insertion of the image acquisition device 210 (industrial endoscope 301) into the pipe 311, that is, difference data of images, is extracted from within image data that was acquired in step S5 or step S19, and this difference data is made into a population.

On the other hand, if there is a relearning request, a population is reformed in accordance with learning history (S35). In this step, the learning history that was stored in step S1 is referenced and the population is reformed. Specifically, after an inference model was generated the previous time, a population is newly recreated by making images for after the point in time when reliability of the inference results was lowered etc. into a population. When reforming this population, the population is created based on whether images that have been currently observed are similar, based on learning history. Specifically, this is because with images that are later than the time of the previous learning, it is possible to create an inference model of high reliability by making images that are similar to current images into a population. Also, looking at history information, in a case where there is not much difference from the current condition or a case where training data is insufficient, some of the population may simply be modified.

If a population has been generated in step S33 or S35, next image change at the time of a successful insertion is made into training images (S37). In this step, changes in images for a case where the industrial endoscope 301 was inserted into the pipe 311 and moved smoothly, as shown in FIG. 2B, are extracted from images of the population, and this image is associated with information for "successful insertion", and made into training data.

Next, image changes at the time of insertion NG are distinguished and made into training images (S39). In this step, changes in images in a case where it was not possible to move smoothly, when the industrial endoscope 301 was inserted into the pipe 311, as shown in FIG. 2A, are extracted from images of the population, and these images are associated with insertion NG, and made into training data.

Next, an inference model is generated (S41). Here, images that were extracted in steps S37 and S39 are made into training data, and the learning device generates an inference model. Specifically, for respective input images in a case where the result is OK and where the result is NG, the inference engine 203 calculate strengths (weights) of connections between respective neurons in the intermediate layer so that results coincide, and outputs the calculation results as an inference model (refer to FIG. 1A).

If an inference model has been generated, if there is request data inference is performed (S43). Here, if there is request data other than the training images of steps S37 and S39, inference is performed using this request data. Specifically, if there is request data stored in an external database etc. for which results are known, that data is input, and inference is performed using an inference model that was generated in step S41. Also, request data is not limited to data that is stored in external data and may be data that has been newly acquired and for which results are known. Further, through trial and error under request conditions, data in a successful case may also be used as training data. Since an inference model that was generated in step S41 should perform correct inference using these request data, data of practical image groups (request data) should be used. By performing this inference it is possible to estimate reliability of an inference model that was generated in step S41.

It is then determined whether or not reliability of inference is greater than or equal to a specified value (S45). Here, reliability of an inference model that was generated in step S41 is determined on the basis of inference results in step S43. Determination of reliability is performed, for example, by calculating a LOSS value etc. In a case where deep learning has been performed with an exercise that has been previously solved (for example, OK or NG at the time of insertion), a LOSS value is a difference between an inference result with an inference model that has been generated by deep learning and the previously known solution. As an exercise for which the solution is known in advance, request data of step S43 may be used, and images at the time of insertion (images other than training images) that are stored may be used. Besides this, if verification is performed with previous request data, a result is displayed as "OK (successful)" for a case where the test was successful, and it is always displayed as "NG (not successful)" for a case where the test was unsuccessful, it can also be determined that reliability of the inference model is good.

If the result of determination in step S45 is that reliability is not a given value or greater, resetting of the learning matrix is performed (S49). The fact that reliability is low means that there is a possibility that a population of image data that was used when the inference model was generated in step S41 was not suitable. In this step, therefore, an attempt is made to change the population. In this case, processing may be performed to change to image data of a suitable period, based on the learning history, etc. If resetting of the learning matrix has been performed, processing advances to step S41 and generation of an inference model is performed again.

On the other hand, if the result of determination in step S45 is that reliability of the inference model is high, the inference model is transmitted (S47). The image acquisition device 210 (industrial endoscope 301) has an inference model installed at an initial stage. In this step when a new inference model has been generated, the new inference model is transmitted by means of the communication section to the requesting image acquisition device 210. Once the inference model has been transmitted, this flow is terminated.

In this way, in the first embodiment of the present invention, in the image acquisition device 210 (industrial endoscope 301) if image change is not smooth and warning display is performed, and if a state where the user ignores the warning display continues a request for relearning is issued to the learning device. As a result of relearning it becomes possible to constantly maintain an inference model of high reliability.

It should be noted that with this embodiment, a request for relearning is based on behavior of the user when warning display has been performed, and problems etc. arising after that. However, times when relearning is requested are not limited to this. For example, relearning may be requested in cases where it is considered that an environmental condition has been changed from the one assumed by an inference model that was previously set, such as where a physical object is different to what the physical object was previously, or where the operator has changed due to lapse of a specified time after setting of an inference model in a device. Also, in a case where too much time is being taken etc. even if an inference model is used and it is not possible to perform operations well, relearning may be requested. In these cases, training data may be newly collected (may be created by the device itself, or may be acquired from outside) and relearning requested. Also, for example, in an image acquisition device LOSS values may be calculated at specified times using this training data (may also be request data), and a relearning request performed based on the results of this calculation.

Also, in the case of an industrial endoscope such as shown in FIG. 2A and FIG. 2B, for example, in a case where an image group earlier that at the time of collision with a pipe wall has been input to an inference engine, it is necessary to display a warning before the collision. On the other hand in a case where specific observation is possible without collision, if the image group at the time of that operation has been input to the inference engine it is necessary for OK display to appear together with display of the image group. This constitutes reliability determination as to whether or not a correct learning model was possible based on correct request data (determination of S45).

In the embodiments of the present invention description has been given using FIG. 1A to FIG. 4, but there is a close relationship with other embodiments, and there may be cases where the technical ideas that have been explained for other embodiments may be used directly or used in slightly modified form. Drawings of the other practical examples may be referred to for describing such sections being applied by sharing technical ideas. However, in order to avoid redundancy regarding duplicated section that have been described in the other sections, repeated description will be omitted. Specifically, there may be cases where for this embodiment sections that are closely related to other embodiments are described with drawings other than FIG. 1A-FIG. 4 as substitutes.

Next, a second embodiment of the present invention will be described using FIG. 5A to FIG. 8B. This embodiment is an example that has been applied to a camera, as an image acquisition device comprising a learning system. An inference model such as shown in FIG. 1B that has been acquired by machine learning, or a inference engine that uses inference, has been obtained by learning based on previous learning results, regardless of whether or not there is training data. Therefore, there is a possibility of performing unforeseen inference in accordance with differences between previous and current conditions, or differences in conditions between an assumed scene and a scene that is actually used. It is therefore preferable to perform appropriate maintenance. With this embodiment, with the concepts that were described in FIG. 1A, optimum inference is made possible while performing appropriate maintenance assuming such conditions.

This camera works in cooperation with a social network system, and assumes an environment such as where a third party writes quality assessment (not necessarily limited to subjective evaluation) such as "like" to a contents item or the like (user contributed photograph or blog etc.) that has been posted on the social network. In such an environment, among contents items that have been posted, specified contents items to which quality assessment information has been attached are used as training data at the time of inference as to what type of contents items receive what type of evaluation. Contents items on the evaluation results for those contents items should therefore be acquired from a social network. Accordingly, using training data that has been acquired it is possible to perform machine learning in order to infer relationships between characteristics and quality assessment of contents items using a computer etc. As a result of performing inference using an inference model that has been acquired by this machine learning, it becomes possible to predict what type of evaluation contents items that will be posted in the future will receive.

A camera in which the above described inference engine has been installed displays guidance for images stored in an external database so as to shoot images that will be evaluated as "like" by third-party. This guidance is performed using an inference model that has been inferred by a learning section, using images and evaluations that have been stored in an external database FIG. 5A is a block diagram mainly showing the electrical structure of a learning system of the second embodiment. This learning system has a camera 10 and an external unit 20. The camera 10 corresponds to the image acquisition device having the learning management control section 207A in FIG. 1A, and the external unit 20 corresponds to the learning devices A and B.

The camera 10 has an image input section 11, an inference engine 12, a communication section 14, a display section 15, a setting section 16 and a control section 17. This camera 10 functions as an imaging device that receives inference models. The image input section 11 has a photographing lens, image sensor, imaging control circuit, image data processing circuit, etc., and generates image data of a subject. The image input section 11 functions as an imaging section that forms a subject image and outputs image data.

The inference engine 12 is input with inference models that have been generated by an input output modeling section 28, described later, within the external unit 20, and stores the input inference models in a storage section 13 as learning deliverables 13a. Using the inference models that have been stored in the storage section 13, the inference engine 12 infers whether or not image data that has been input by the image input section 11 is an image that matches a request that has been set by the setting section 16. The inference engine 12 has an input layer, intermediate layers, and an output layer, similar to FIG. 1B, with strength and weighting of neuron connections between these layers being set in accordance with inference models (learning deliverables) that have been stored in the storage section 13. The inference engine 12 functions as an inference engine (inference section) that is input with image data and acquires output for performing guidance display to a user using inference models. Also, the inference engine 12 functions as an inference engine (inference section) that is input with image data and acquires output for performing guidance display to a user using specified inference models that have already been learned.

The communication section 14 has a communication circuit and performs wireless or wired communication with a communication section 26 of the external unit 20, by means of a network or the like. This communication section 14 transmits requests that have been set in the setting section 16 to a learning section 25, and inputs inference models that have been generated by the input output modeling section 28. The communication section 14 also functions as an input interface (input section) that is input with inference models.

It should be noted that in a case where the camera 10 cannot directly access the external unit 20, the camera may communicate with the external unit 20 by means of a portable communication device such as a smart phone. Also, in the event that the camera 10 itself is incorporated into a portable communication device such as a smartphone, the camera may communicate with the external unit 20 by means of this portable communication device.

The display section 15 has a display such as a display panel, and performs display based on image data that has been acquired in the image input section 11. The display section 15 also performs display of inference results of the inference engine 12. Items to be set in the setting section 16 are also displayed, as shown in FIG. 5B. The display section 15 displays date 15b when previous learning was performed, and also displays an update icon 15c for the user to perform a relearning request manually. It should be noted that instruction of relearning is not limited to the update icon 15c and may be performed as a result of operation of an operation member such as a switch or dial etc. The display section 15 functions as a display that performs guidance display based on output of the inference section.

The setting section 16 includes an interface circuit, and sets requests when the user requests inference models. For example, it is possible to set shooting guidance so that it is possible to shoot photographs that will be evaluated from third party (for example evaluated as "like" from a third party), and that the user wants. With the example shown in FIG. 5B it is possible to set accompanying information such as nationality and gender of evaluator (target follower) and theme etc. so as to match the user's request. However, care should be taken that in a network environment typifying this type of social network system there is a possibility of content items sometimes being contributed and posted, and posted content items sometimes have a possibility of being subjected to quality assessment by users (including preferred users) of the social network system. This means that in this type of environment there is a possibility of what is in vogue changing severely, and in particular, there are cases where follower inclination changes in accordance with entry of new innovative content items, new evaluators joining, and other opinion leaders joining. For this type of change in conditions over time, there is a risk that an inference engine may become obsolete.

The control section 17 is a processor having a CPU (Central Processing Unit), peripheral circuits and a memory etc., and the CPU performs control of each section within the camera 10 in accordance with a program that has been stored in memory.

The control section 17 has a learning management section 17B. The learning management section 17B determines whether to perform confirmation of reliability etc. of inference that used an inference model as was described using FIG. 1A (the learning management control section 207A in FIG. 1A), and if reliability has been lowered issues a request for relearning to the learning device. Also, in a case where the user has instructed relearning by touching the update icon 15c also, a request for relearning is issued to the learning device (refer to S63 to S73, and S81, in FIG. 6).

Figure 6:
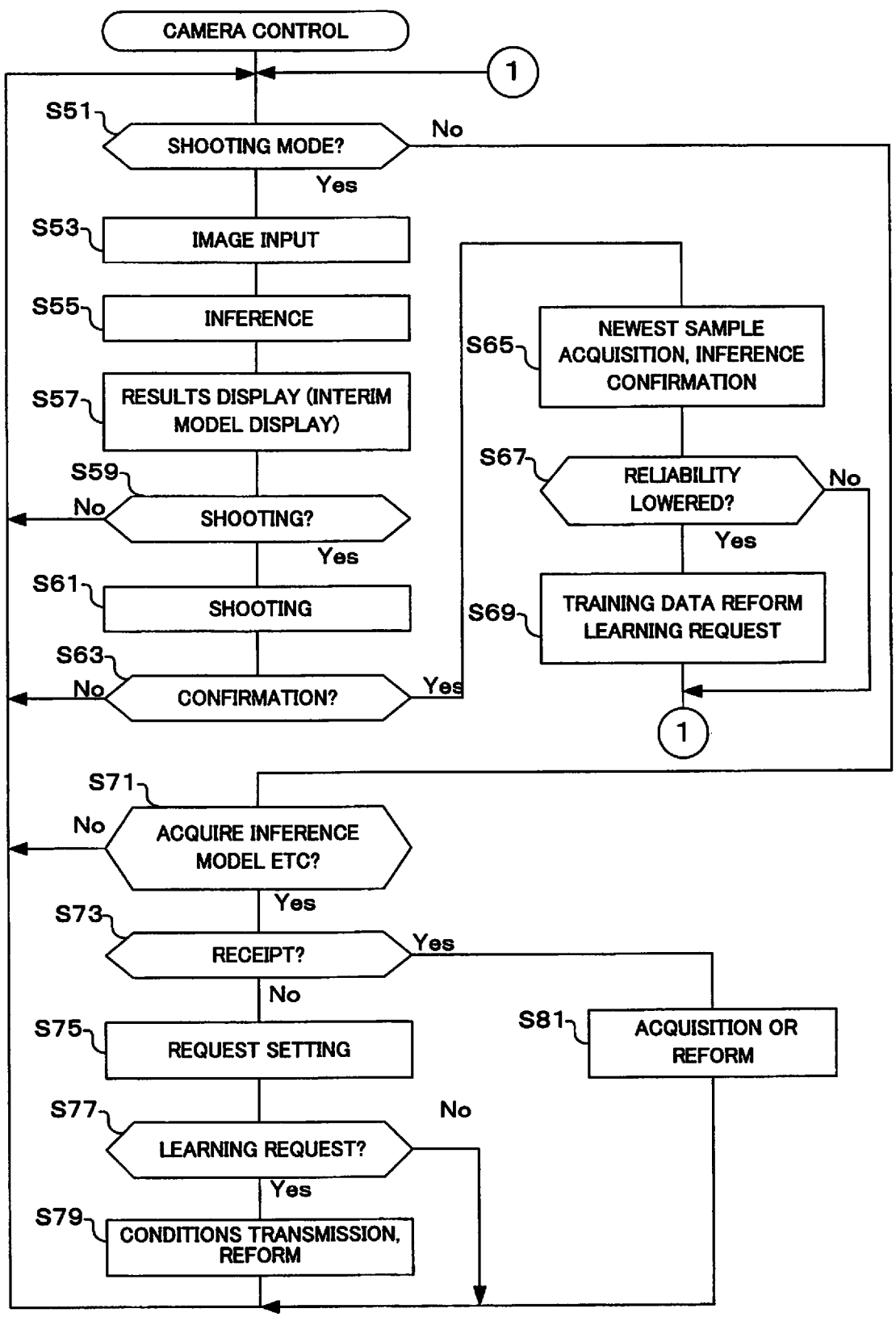
FIG. 6 is a flowchart showing operation of a camera of the learning system of the second embodiment of the present invention.
Figure 11A:
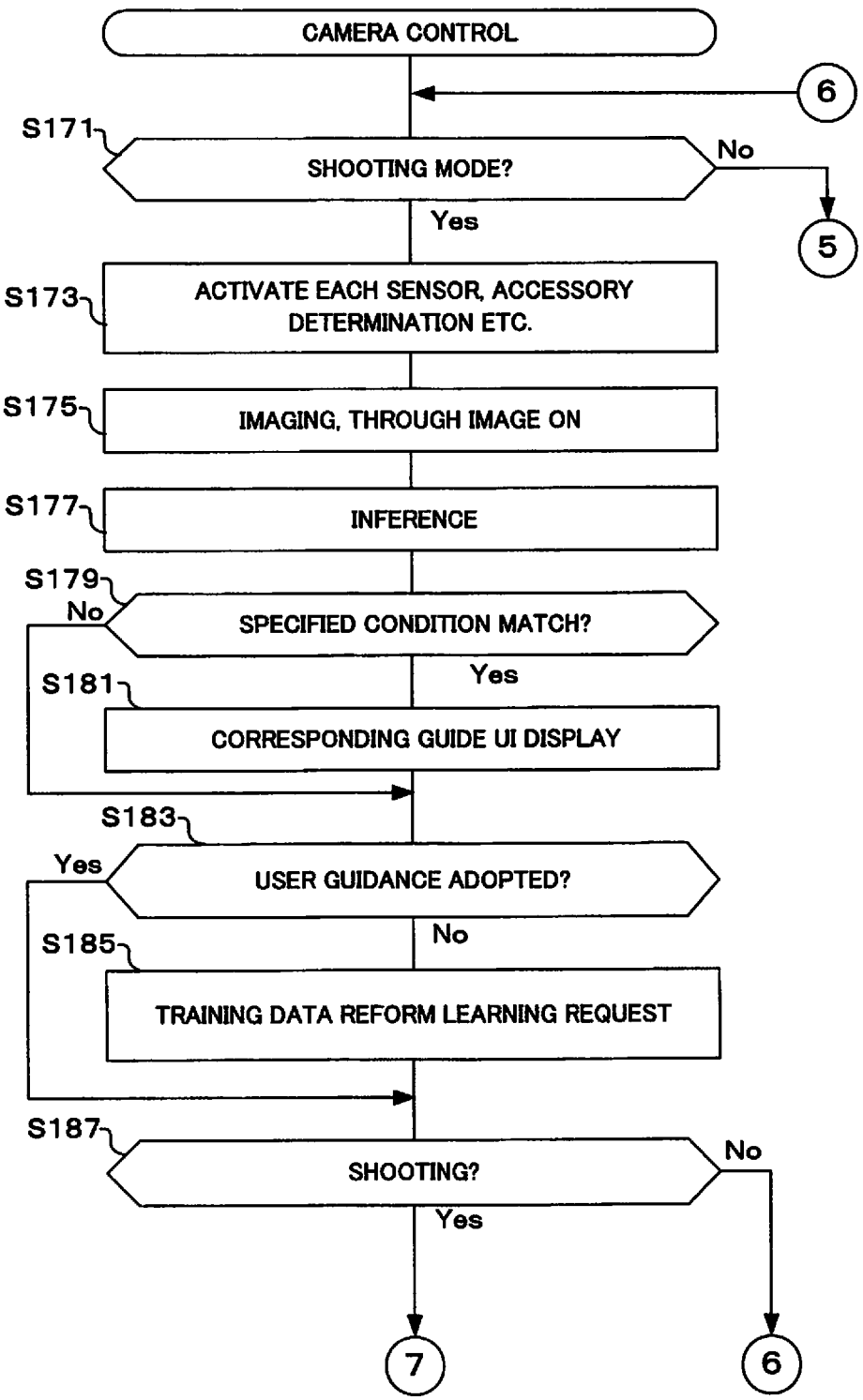
FIG. 11A and FIG. 11B are flowcharts showing operation of a camera of the learning system of the third embodiment of the present invention.

The learning management section 17B functions as a processor that confirms if there is a specified relationship between a trial input image and trial guidance display for this trial input image under conditions that have been assumed at the time of use, and that determines whether or not it is necessary to relearn the inference model that has been learned based on the result of this confirmation (refer, for example, to S15 and S19 in FIG. 3, S63 in FIG. 6, and S183 and S185 in FIG. 11A). The learning management section 17B functions as a processor (update confirmation section) that performs determination for update of an inference model, and based on the result of this determination, requests update of the inference model to an external learning device or requests determination as to whether or not update of the inference model is necessary (refer, for example, to S15 and S19 in FIG. 3, S63 in FIG. 6, and S183 and S185 in FIG. 11A). The processor (update confirmation section) acquires the newest training data, calculates reliability of an inference model currently being used using this newest training data, and if this reliability is low requests update of the inference model to an external learning device (refer, for example, to S65, S67, and S69 in FIG. 6).

Also, if a specified time has elapsed from requesting update of the inference model to the external learning device, this processor (update confirmation section) requests update of the inference model to the external learning device, or requests determination as to whether or not update of the reference model is necessary (refer, for example, to S65 in FIG. 6). The processor (update confirmation section) monitors change of current state, and if the current state has changed requests update of the inference model to the external learning device (refer, for example, to S7 to S19 in FIG. 3, S63 in FIG. 6, and S271 in FIG. 12B, etc.). In a case where the user has not used guidance display and the displayed guidance is thereby not reflected in operation, the processor (update confirmation section) determines that current state has changed (refer, for example, to S15 and S19 in FIG. 3, and S183 and S185 in FIG. 11A).

The processor (update confirmation section) also normally performs confirmation as to whether or not update to the inference model is necessary (refer, for example, to S63 in FIG. 6). Also, the external device performs confirmation as to whether or not update of the inference model is required, and the processor (update confirmation section) performs determination based on the confirmation result from the external device (refer to S63 in FIG. 6 and S157 and S165 in FIG. 8B).

The external unit 20 has an external image database (DB) 21 and a learning section 25. The external image DB 21 and the learning section 25 may be arranged inside the same device, and the two may be able to cooperate through communication. Also, a plurality of external image DBs 21 may be provided, and it may be possible for the communication section 25 and the communication section 26 to communicate with the plurality of external image DBs to access image data, and acquire information relating to image data, from the learning section 25.

The external image DB 21 has a communication section 22, an image classifying section 23, and a control section 24. The external image DB 21 is capable of being accessed from third party, and for example, if a third party likes something, the fact that it suits the taste of the third party is displayed as an expression such as "like" etc. This expression is stored in the external image database in association with the image that has been evaluated, by means of a network, and published by means of the network. The external image DB 21 functions as a database that stores usable data when an inference model is generated using learning. The external image DB 21 functions as a database that stores data that can be used when an inference model is generated using learning, and that contains third party evaluation.

The communication section 22 has a communication circuit and performs exchange of data with the communication section 26 of the learning section 25. The image classifying section 23 performs image classification for image data stored within the external image DB 21, or stored in an image DB that is external to the external image DB 21. Follower profiles 23a and themes 23b are stored in the image classifying section 23. Generally, image data is stored in the image DB together with third party evaluations relating to that image, for example, a number of evaluations of "like" by a third party). Follower profiles 23a store information (follower profile, for example, a region where the follower lives, gender, age, etc.) relating to a person (follower) who has given an evaluation of "like". The themes 23b store image themes, for example, information such as photographed object (for example, scenery, people, food etc.) in association with an image.

The control section 24 is a processor having a CPU (Central Processing Unit), peripheral circuits and a memory etc., and the CPU performs control of each section within the external image DB 21 in accordance with a program that has been stored in memory. The control section 24 has a DB management section 24b.

The DB management section 24b manages image data stored in the external image DB. The DB management section 24b functions as a processor (time determination section) that determines whether or not a specified time has elapsed after learning in order to generate an inference model (refer, for example, to S151 in FIG. 8B). The DB management section 24b functions as a processor (determination section) that, in the event that that has been determined by the processor (time determination section) that a specified time has elapsed, searches a database on the basis of conditions that were used when the previous inference model was generated and determines whether or not upper data is changing (refer, for example, to S153 and S155 in FIG. 8B). The DB management section 24b functions as a processor (recommendation section) that recommends update of an inference model in the event that it has been determined by the processor (determination section) that upper data is changing (refer, for example, to S157 in FIG. 8B).

Figure 8B:
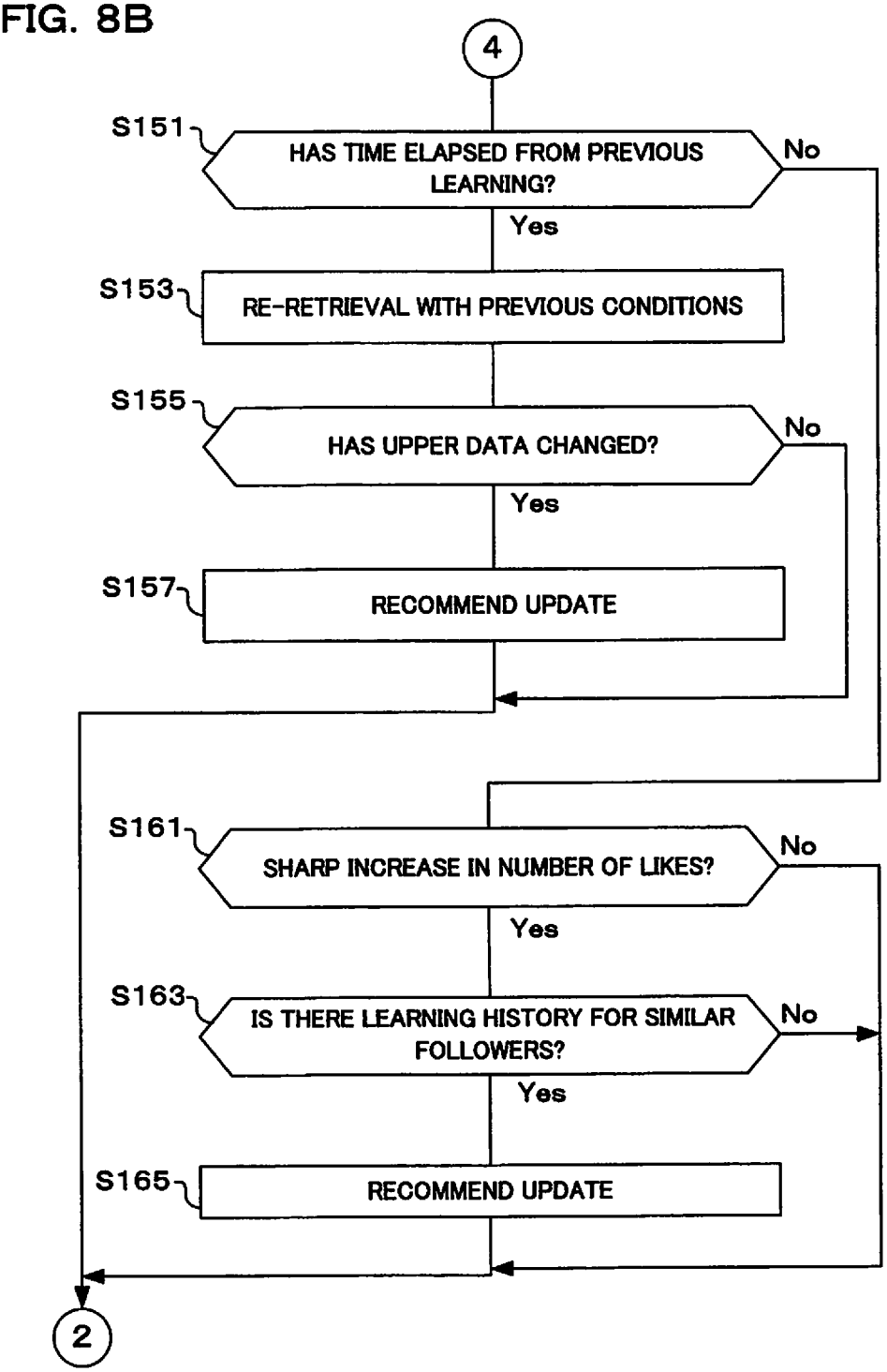

The DB management section 24b functions as a processor (determination section) that determines whether or not there has been change to third party evaluation (refer, for example, to S161 in FIG. 8B). The DB management section 24b functions as a processor (recommendation section) that recommends update of an inference model in the event that it has been determined by the processor (determination section) that there has been change to third party evaluation (refer, for example, to S165 in FIG. 8B).

The learning section 25 has the communication section 26, population creation section 27, input output modeling section 28, and control section 29. The learning section 25 generates an inference model from image data stored in the external image DB 21, which enables users to perform a shooting based on requests of the user of the camera 10. A request constitutes evaluation criteria at the time of determination regarding quality of an image prior to actual shooting. For example, the learning section 25 extracts images that match requests that have been transmitted from the camera 10, and that have evaluations from third parties greater than a given value from within the image database, performs deep learning using these images that have been extracted, and outputs an inference model (refer, for example, to S91 to S99 in FIG. 7A). By inputting images before shooting or at the time of shooting to the inference engine in which this inference model has been set, it is possible to determine whether or not there are images of a desired quality level.

Figure 7A:
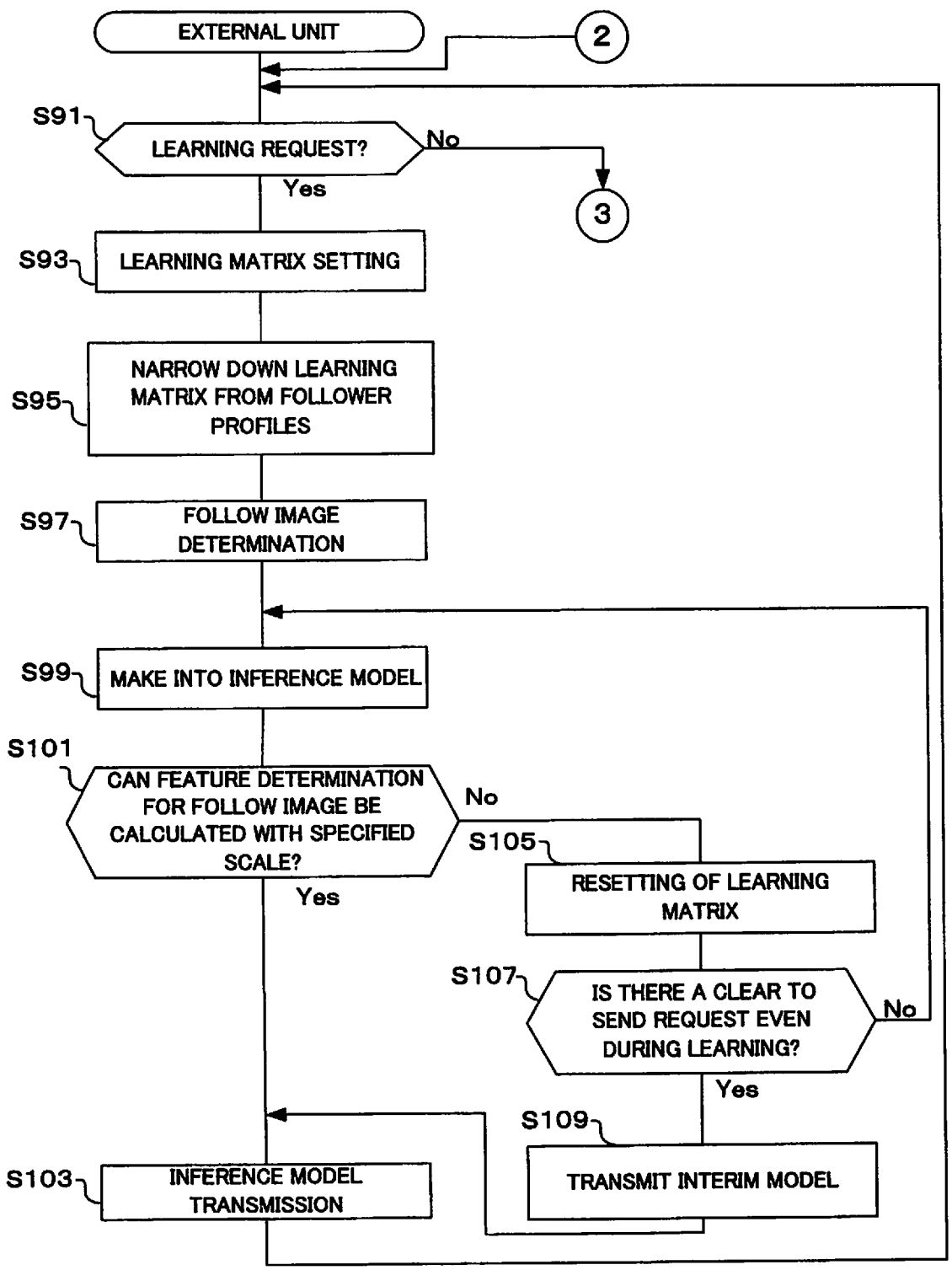
FIG. 7A and FIG. 7B are flowcharts showing operation of an external unit of the learning system of the second embodiment of the present invention.

Also, in a case where a reliable inference model has been generated in a range of image data for which deep learning has been determined, this learning section 25 outputs the inference model as an interim inference model, (refer, for example, to S101 and S105 to S109 in FIG. 7A).

The communication section 26 has a communication circuit and performs exchange of data with the communication section 22 of the external image DB 21. The communication section 26 also performs exchange of data with the communication section 14 of the camera 10.

The population creation section 27 is a processor that is separate, or the same as, the processor constituting the control section 29, and creates an optimal population based on requests that have been set by the setting section 16 of the camera, which will be described later. All image data may be used as it is as an optimum population. However, if the population is too large time will be required for processing.

Also, if the population is too large there may be cases where there is overfitting and reliability is lowered. It is therefore preferable to extract a population of a suitable size from all image data using information such as nationality, gender etc. that can be transmitted as accompanying information.

Figure 7B:
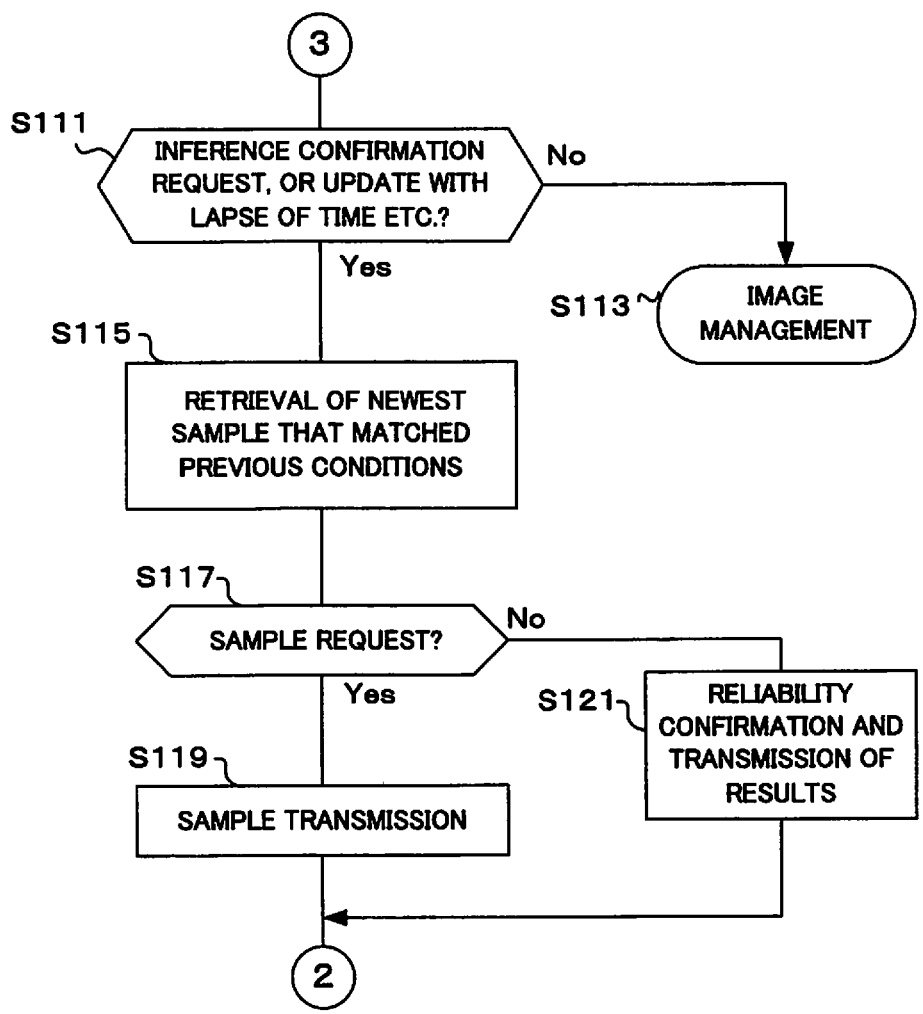

The population creation section 27 functions as a processor (population creation section) that, when the determination section has determined that requests for inference model confirmation have been input, or that a specified time has elapsed from update of the previous inference model, sets a learning matrix from the database (refer, for example, to S115 in FIG. 7B). This processor (population creation section) sets a learning matrix from the database based on conditions that were used when the previous inference model was generated (refer, for example, to S115 in FIG. 7B).

The input output modeling section 28 performs deep learning (machine learning) using so-called artificial intelligence (AI). Specifically, using an image data population that has been created by the population creation section 27, the input output modeling section 28 generates inference models for images that will satisfy requests that have been set by the setting section 16, by deep learning. The input output modeling section 28 has the structure of the inference engine as shown in FIG. 1B. An input layer I is input with image data that has been created by the population creation section 27. Also, an output layer O provides image evaluation results, for example, training data (correct solution) such as "French girls in their twenties gave a high evaluation (evaluation of like)". An inference model is generated by calculating strength (weight) of connection between each neuron $N11$ to $N2n$, so that the input and output match. It should be noted that the input output modeling section 28 is not limited to an inference engine and may be implemented using a CPU or the like and a program.

It should be noted that if image data population is large, it will take a correspondingly long time until the inference model is completed as a result of deep learning (months or years depending the size of the population and on requests (conditions) that have been set by the setting section 16). Therefore, even if inference has not been completed for all image data of the population, in a case where a fixed level of reliability can be expected, an inference model at that time may be output to the camera as an interim inference model (refer to S107 and S109 in FIG. 7A).

The control section 29 is a processor having a CPU (Central Processing Unit), peripheral circuits and a memory etc., and the CPU controls each section within the learning section 25 in accordance with a program that has been stored in memory.

The control section 29 has a learning management section 29b. The learning management section 29b creates a population in the population creation section 27 if a request for relearning is received from the camera 10, and generates an inference model by performing relearning in the input output modeling section 28 using this population. Also, a function of confirming an inference model may be performed by the learning management section 29b instead of by the learning management section 17B of the camera 10. Processing in this case will be described later using FIG. 8A and FIG. 8B.

The learning management section 29b functions as a processor (determination section) that determines whether or not a request for inference model confirmation has been input, or determines whether or not a specified time has elapsed from update of the previous inference model (refer, for example, to S111 in FIG. 7B). The learning management section 29b functions as a processor (update confirmation section) that determines the necessity of update based on reliability of an inference model that has received a request for, using the learning matrix that was created by the population creation section (refer to S121 in FIG. 7B).

It should be noted that some or all of the peripheral circuits of the CPU within the control sections 17, 24 and 29 may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits. Also, some functions of the CPU may be implemented by circuits that are executed by program code such as a DSP, may use a hardware structure such as gate circuits that are generated based on a programming language described using Verilog, or may be executed using hardware circuits.

Next, operation of this embodiment will be described using the flowcharts shown in FIG. 6 to FIG. 8B.

FIG. 6 shows operation of the camera 10, and the flowchart shown in FIG. 6 is executed by the control section 17 in accordance with a program that has been stored in memory. If the processing flow for camera control is commenced, it is first determined whether or not the camera is in shooting mode (S51). In this flow, only two modes of the camera 10 will be described, namely a shooting mode and a learning mode. It is, however, also possible to execute other modes besides these two modes, such as playback mode. If learning mode has not been set using an operation member (not shown), it is determined to be shooting mode. It should be noted that learning mode is a mode in which the user requests generation of inference models to the learning section 25 using the setting section 16.

If the result of determination in step S51 is shooting mode, then image input is performed (S53). In this step the image input section 11 acquires image data. Through images are displayed on the display section 15 based on this image data that has been acquired.

If images have been input, next inference is performed (S55). Here, the inference engine 12 performs inference on image data that has been input, using an inference model that has been generated by the input output modeling section 28 (acquired in step S81, which will be described later). The inference engine 12 is constructed as shown in FIG. 1B. The input layer I of this inference engine is input with image data that has been input by the image input section 11, and an inference model that is stored in the storage section 13 is set as strength (weight) of connections between each of the neurons N11 to N2n. Output from the output layer O of this inference engine 12 constitutes inference results.

If inference has been performed, next the inference results are displayed (S57). Here, results of inference that was performed in step S5 are displayed. For example, if a request for the learning section 25 includes accompanying information corresponding to "photographs that have received evaluation from French girls in their 20s", whether or not an image that was input in step S53 matches this request, that is, whether or not the image has received a third party evaluation ("like") a certain number of times or more, is displayed on the display section 15.

It should be noted that in a case where, without completion of deep learning for image data that has been initially set as population for learning in the input output modeling section 28, an interim inference model is generated for a population of image data that has been set again, and transmitted, and the inference engine 12 performs inference using the interim inference model, display may be performed so that it will be known that the interim inference model has been used. Also, in a case where an inference model is not suitable for an image that is currently being subjected to through image display, warning display, such as that inference is not possible, may be performed. Also, in the event that results of inference are that evaluations are not obtained from third parties, advice display for shooting photographs that will obtain evaluation may be performed. An inference engine in which an inference model for performing this advice display has been set may be provided.

If display of inference results has been carried out, it is next determined whether or not to perform shooting (S59) Here, determination is based on whether or not the release button of the camera 10 has been pressed fully. When determining whether or not to perform shooting, the user can reference display of the inference results of step S57. Shooting may also be performed with reference to advice display. If the result of determination in this step is that shooting will not be performed, processing returns to step S51 and the previous operations are executed.

If the result of determination in step S59 is to perform shooting, then shooting is executed (S61). Here, the camera 10 performs exposure control so as to achieve correct exposure, applies image processing for storage to image data that has been output by the image input section 11, and stores image data that has been subjected to image processing in a storage medium.

Once shooting has been performed, whether or not to update (relearn) an inference model is confirmed (S63). As was described using FIG. 1A, even if an optimal inference engine is generated, if there are changes in conditions after that, reliability of the inference model will be lowered. Specifically, it is verified whether or not the shooting result of step S61 has been inferred with an optimum evaluation. That is, it is possible to confirm whether or not quality determination and quality level determination in accordance with a user request are valid in current conditions also. Therefore, in a case where whether or not to update (relearn) an inference model is uncertain, a divergence is provided so that it is possible for the user to confirm this fact. For example, in a case where shooting guidance so that it is possible to shoot an image that will be evaluated as "like", as described above, is displayed, there may be cases where a "like" evaluation is not received due to change in a reader's preferences etc. In this step, therefore, determination as to whether or not to confirm whether or not relearning is necessary is performed so that it is possible to update to an optimal inference model. If the result of determination in this step is that it is not possible to confirm the need for relearning, processing returns to step S51 and the previous operations are executed.

In step S63, regarding whether or not to confirm update, determination may be performed by the camera under specified conditions, instead of the user simply performing a manual operation, and a request may be issued to an external unit and the result of that confirmation for update reflected. For example confirmation may be constantly performed in order to perform normal online learning. Also, in step S69, confirmation for updates may be performed automatically if a specified time has elapsed from a point in time when relearning was requested. In this case, steps S65 and S67, which will be described later, may be omitted and relearning requested in step S69. Also, in a case where update of an inference model has been determined to be necessary by monitoring images etc. at the external database side, there may be cases where confirmation is requested at the camera side (refer, for example, to S157 and S165 in FIG. 8B). In this case, steps S65 and S67, which will be described later, may be executed, but these steps may also be omitted and relearning requested in step S69. Further, evaluation of images may be requested using taken images, as described previously. Also, newest popular images etc. may be acquired and input to a current inference model that has been set within the camera 10, and determination performed as to whether or not high evaluations appear.

Further, as a method for confirming update in step S63, images that have been taken with the camera 10 may be uploaded to an external database, and determination based on external evaluation such as having been evaluated as "like". In spite of being guided for shooting by the inference model of the camera 10 so as to receive evaluations of "like", a case where images are not evaluated as "like" upon being uploaded to an external database can be considered as meaning that the inference model is not suitable. Also, in a case where the user is using the camera 10 and feels that relearning is necessary, the update icon 15*c* is operated. In this step, it is determined whether or not this operation has been performed.

If the result of determination in step S63 was to perform confirmation as to whether or not to perform relearning, next the newest sample is acquired and inference results are confirmed (S65). Inference by the inference engine is inference results (output) when input data has been input. The newest sample is input data and evaluation results such as quality for this input data, and it is possible to acquire images that satisfy those conditions as a result of requesting to the learning section 25 (refer to S117 and S119 in FIG. 7B). As a way of obtaining the newest sample, besides acquiring the sample from the learning section 25, there may be images that have received evaluation results from a third party as a result of having uploaded images that have been acquired by the camera 10, or the newest sample may be acquired by means such as regularly gathering third-party evaluations in the learning section 25 or the external image DB 21. Images may be uploaded to an external database, and made into a newest sample in conjunction with evaluation results at this time. Here, an example where requests are centered on the camera has been shown, but the need for the camera to acquire a newest sample may also be determined using information that has been transmitted/received to/from an external unit. That information may also be the sample itself. It should be noted that although the training data has a large amount of data for generating inference models, sample data may be of an amount sufficient for it to be possible to confirm reliability of the inference model.

It is next determined whether or not reliability has been lowered (S67). In this step, inference is performed in the inference engine 12 using the quality of newest samples that have been acquired in step S65 as training data, and it is determined whether or not reliability of those inference results has been lowered. Specifically, in the event that a proportion of cases where results for input data disagree is larger than a given value it is determined that reliability has been lowered. It should be noted that confirmation of lowered reliability does not always need to be performed at this time, and it may be made possible to reference reliability at the time of the inference model acquisition of step S71.

If the result of determination in step S67 is that reliability has been lowered, learning of reformed training data is requested (S69). Here, the camera 10 requests relearning to the learning management section 29*b* by communicating with the communication section 14 and the communication section 26 of the learning section 25. The learning management section 29*b* generates new training data by referencing a learning history etc. in the population creation section 27 if a request for relearning is received, and generates an inference model in the input output modeling section 28 using this training data (refer to FIG. 7A). If learning that renewed training data has been requested in step S69, or if the result of determination in step S67 is that reliability has not been lowered, processing returns to step S51 and the previously described operations are executed.

Returning to step S51, if the result of determination in this step is not shooting mode it is determined whether or not an inference model etc. is to be acquired (S71). In a case where the user wants to acquire shooting guidance (this may be manually determined or automatically determined), use of shooting guidance is requested and transmitted to the learning section 25. For example, in a case where it is desired to shoot photographs that will receive a high evaluation ("like") by a third-party, the user transmits a request that they have set with the setting section 16 to the learning section 25 of the external unit 20. A request sets accompanying information such as nationality, gender and theme etc. for evaluators (target followers) such as, for example, "photographs that will receive evaluation from French girls in their twenties" (refer to step S75 for details). An inference model is then returned from the learning section 25, and the camera 10 performs shooting using this inference model. At this time, if an inference model has already been acquired it is also possible to perform some sort of revision or upgrade. Accordingly, reliability determination as in step S67 may also be performed in this step.

In step S71, it is determined whether or not the user wishes to acquire this inference model. Since the user has set learning mode using a touch panel or an operation member, determination is based on operating states of these sections. If the result of this determination is not to acquire the inference model etc., processing returns to step S51 and the previously described operations are performed.

It is next determined whether or not the inference model has been received (S73). If a request was transmitted to the learning section 25 in step S79, which will be described later, or if relearning was requested to the learning section 25 in step S69, an inference model is transmitted from the learning section 25 (refer to S103 in FIG. 7A). In this step it is determined whether or not an inference model transmitted from the learning section 25 has been received.

If the result of determination in step S73 is that the inference model has been received, acquisition or reforming (update) of the inference model that has been specified for use is performed (S81). Here, an inference model is received, and if an inference model has already been received, it is reformed to (replaced with) the newly received inference model. This reforming (update) of the inference model is assumed to be in response to a request, and in the event that this request has already been issued it is not necessary to perform the update again, and a new version of the inference model is acquired. Also, even if there is no request information, if there is an inference model that can be used for general use, this general use model may be acquired. If processing in this step has been performed, step S51 is returned to.

If the result of determination in step S73 is not receipt, request setting is performed (S75). In the event that the user requests deep learning to the learning section 25, a request is set in the setting section 16 in order to perform shooting in accordance with the user's intention. In this step, setting of these requests is carried out. As described previously, a request is an item (accompanying item) that is set in order to receive high evaluation from a third party. This accompanying item is a profile (also called "follower profile") of a third party, such as nationality, gender, age etc. of an evaluating third party, and photograph theme, such as scenery, people, food etc. (these may be collectively referred to as "target profile"). It should be noted that the requests are not limited to follower profiles and themes, and as long as they are conditions that represent photographs in line with the user's intention, or that represent the users intentions, these conditions may be appropriately included. Also, a request does not always have to be written as text, and may be expressed with an image itself matched with the user's intention. If a request has already been set, it may follow the setting. However, there may be a case where a request is not always valid. For example, in the case of images the user has intended or there are no or too few evaluators, display may be performed such as it is not possible to perform deep learning.

It is then determined whether or not to request learning (S77). In this step it is determined whether or not a request that was set in step S75, for example a request that was set with accompanying information such as nationality, gender and theme etc. has been sent to the learning section 25 of the external unit 20 by means of the communication section 14. If the result of this determination is that there is no request, processing returns to step S51.

If the result of determination in step S77 is to request learning, conditions are transmitted, and reforming of an inference model is performed (S79). Here, a request that was set in step S75 is transmitted to the learning section 25 by means of the communication sections 14 and 26.

In this way, with the camera control of this embodiment, it is confirmed whether or not to update an inference model used in shooting guidance etc. (refer to S63), and if it is confirmed that update is necessary inference is performed using the inference engine 12 of the camera 10 by acquiring a new sample (training data etc.), and determination is based on reliability of this inference result (refer to S65 to S69). As a result, it becomes possible to maintain an optimum inference model, even with a device that uses an inference model that used deep learning offline, after having previously received the reference model.

Next, operation of the external unit 20 will be described using the flowcharts shown in FIG. 7A and FIG. 7B. This operation is realized by the learning management section 29b and the DB management section 24b within the external unit 20 controlling each section within the external unit 20 in accordance with a program that has been stored in memory.

If the external unit control flow shown in FIG. 7A is commenced, it is first determined whether or not there is a learning request (S91). As was described previously, in steps S69 and S79 the camera 10 requests learning to the learning section 25 of the external unit 20 by means of the communication section 14.

If the result of determination in step S91 is that there is a request for learning, setting of a learning matrix is performed (S93). All image data of the external image DB 21 and usable external image DBs may be used as a population for learning. However, in order to perform learning efficiently, here image data that will be a target of deep learning is extracted from an external image database based on a request from the user, and a learning matrix is set.

Narrowing down of the population is then performed from follower profiles (S95). There may be cases where profiles of followers who have given a "like" evaluation for an image that is made a target at the time of deep learning are included in a request that has been set in the setting section 16. In this case, narrowing down of the population may be performed using follower profiles. Also, in the event that a follower profile is not included in a request, images having a high evaluation are extracted based on accompanying information that is included in the request, and follower profiles for these images are acquired. If a follower profile is known, in this step narrowing down of the population for learning is performed using this information.

Determination of follow images is next carried out (S97). Here, it is determined whether or not there is an image that matches a request that has been set by the user in the setting section 16 from within image data of the population, namely whether or not there is an image that has received a high evaluation from a third party (an image that has been evaluated as "like"). Images that have been determined to match a theme in this determination (follow images) are made input images for at the time of deep learning in the input output modeling section 28.

Next deep learning is performed and an inference model is generated (S99). Here, the input output modeling section 28 performs deep learning on the population that has been set using follow images, and generates an inference model.

If generation of an inference model is commenced, it is determined whether or not calculation of feature determination for a follow image is possible at a specified scale (S101). Depending on size of the population, on the number and features of a follow image, and on circuit scale for carrying out deep learning, there may be cases where the time required for performing deep learning becomes quite long. Here, whether or not calculation will be completed within a time that can normally be tolerated by the user as time for generating an inference model is determined.

If the result of determination in step S101 is that calculation at a specified scale is possible, an inference model is transmitted (S103). Here, if the input output modeling section 28 completes generation of the inference model using deep learning, this inference model that has been generated is transmitted to the camera 10 (refer to S81 in FIG. 6).

On the other hand, if the result of determination in step S101 is that calculation of a specified scale is not possible, resetting of the learning matrix is performed (S105). Since there is too much image data that will constitute the learning matrix, the population that will constitute objects of deep learning is once again changed and reset, using the request (accompanying information, etc.).

If resetting of the learning matrix has been performed, it is next determined whether or not there is a clear to send request, even during learning (S107). As was described previously, a lot of time is taken up by deep learning. Therefore, as was described previously, there may be cases where, if an inference model of a certain degree of high reliability is generated, the user requests transmission of this interim inference model. In this step it is determined whether or not this request has been issued. If the result of determination in this step is that there is no transmission request, processing returns to step S99.

It should be noted that whether or not there is an inference model of a certain high level of reliability may be determined by whether or not a LOSS value is lower than a threshold value. In a case where deep learning has been performed with an exercise that has been previously solved, a LOSS value is a difference between an inference result with an inference model that has been generated by deep learning and the previously known solution. What type of evaluation method is adopted by an inference model using deep learning will affect reliability of a learning device. With this embodiment the learning device evaluates using a LOSS value.

On the other hand, if the result of determination in step S107 is that there is a transmission request, an interim inference model is transmitted to the camera 10 (S109). Here the learning matrix is set again, and since an inference model is generated with a certain high reliability in this range, this interim inference model is transmitted to the camera 10. If deep learning for generating an inference model is performed after the interim inference model has been transmitted also, and an inference model generated, this inference model is transmitted to the camera 10 (S103). It should be noted that in the event that an interim inference model has been transmitted, generation of the inference model may be completed. In this case step S103 is skipped and processing returns to step S91.

Returning to step S91, if the result of determination in this step is not a learning request, it is determined whether or not there is an inference confirmation request or update due a lapse of time (S111). As was described previously, in the camera 10 update of an inference model is confirmed, and there may be cases where relearning of an inference model is requested (S69 in FIG. 6). The confirmation function may also be performed in the external unit 20, and in this case in step S111 it is confirmed whether or not it is necessary to update the inference model. For example, if a specified time has elapsed after performing learning, updating may be performed. Besides this, the method for confirmation that was performed in step S63 may also be performed. If the result of this determination is not inference confirmation request and also not update due to lapse of time, image management is performed (S113). This image management will be described later using FIG. 8A and FIG. 8B.

If the result of determination in step S111 is inference confirmation request or update due to lapse of time, a newest sample that meets the previous conditions is searched for (S115). In this step, a newest sample (population, training data) that meets conditions (requests) at the time an inference model was generated with the previous deep learning is searched for.

It is next determined whether or not there is a sample request (S117). As was described previously, there may be cases where the camera 10 requests a newest sample to the learning section 25 in step S65 (refer to FIG. 6). In this step determination is based on whether or not a newest sample has been requested from the camera 10 etc.

If the result of determination in step S117 is that there is a request for sample transmission, sample transmission is performed (S119). Here, a newest sample that was retrieved in step S115 is transmitted to the camera 10. On the other hand, if there is no request for sample transmission, reliability is confirmed and the result is transmitted (S121). Here, inference is performed by the inference engine using the sample that was retrieved in step S115, the reliability of this inference result is confirmed, and the result of that confirmation is transmitted to the camera 10. If there has been sample transmission in step S119, or if the result of reliability in step S121 has been transmitted, processing returns to step S91 in the previously described operations are executed.

In this way, with the control flow for the external unit 20, if a learning request is received (S91 Yes), a learning matrix is set (S93), an inference model is generated (S99), and this inference model that has been generated is transmitted (S103). Also, if confirmation of inference is requested, the newest sample is retrieved (S115), and transmitted to the camera 10 if there is a sample request (S115, S117, S119). If there is not a sample request, reliability of the inference model is confirmed and result of reliability is transmitted to the camera (S121). If the camera 10 receives a result indicating the reliability of the inference model is low from the external unit, relearning is requested (refer to S69 and S71 in FIG. 6).

Next, the image management of step S113 will be described using the flowcharts shown in FIG. 8A and FIG. 8B. This image management flow is mainly executed by a CPU within the DB management section 24b that is provided in the external image DB 21.

If the flow for image management shown in FIG. 8A is commenced, it is first determined whether or not there is image acquisition (S121). Images that have been taken by the user with the camera 10 will have been uploaded to the external image DB 21. In this step it is determined whether or not images have been uploaded (image acquisition). If the result of determination in step S121 is image acquisition, images are stored (S123). Here, images that have been uploaded are stored in the database of the external image DB 21.

Once images have been stored, it is next determined whether or not there are comments etc. (S125). There may be cases where information such as a comment is associated with an image. In this step it is determined whether or not there is information such as a comment. If the result of this determination is that there is a comment etc. that comment is stored (S127). Here, the comment is stored, in association with the image, in the database of the external image DB 21. If a comment has been stored in step S127, or if the result of determination in step S125 was that there was not a comment, processing returns to S91 and the previously described operations are executed.

Returning to step S121, if the result of determination in this step is not image acquisition, it is determined whether or not there is image display (S131). There may be cases where a third-party accesses the external image DB 21 and browses images that have been stored in this image database. In this step it is determined whether or not there is a request for image browsing. If the result of determination in step S131 is image display, specified condition image display is performed (S133). In this step images that have been designated by a third party etc. are transmitted to the third party and displayed.

Next, it is determined whether or not comments and likes have been received (S135). In step S133 there may be cases where the user who has received the images sends a comment or gives a like evaluation for the images that have been received. In this step it is determined whether or not there has been a comment or like display. If the result of determination in this step S135 is that there has been a like or comment, storage is performed (S137). Here, a like or a comment is stored in association with the image that was displayed. If a comment or a like has been stored in step S137, or if the result of determination in step S135 was that there was not a comment, or a like, processing returns to S91 and the previously described operations are executed.

Returning to step S131, if the result of determination in this step is not image display, it is determined whether or not there is a request for training data (S141). As training data in the case of the input output modeling section 28 performing inference, there may be cases of extracting from among images that have been stored in the external image DB 21 (refer to S115). Also, the learning management section 29b retrieves the newest sample in step S115. The newest sample has new images to which evaluation results have been added, and old images that have been newly evaluated etc. If there is a sufficient number of sample data (request data) for deep learning, it becomes training data. At the time of this retrieval, there may be cases of retrieving from among images that are stored in the external image DB 21. In this step it is determined whether or not there was a request for retrieval of these training data.

If the result of determination in step S141 is a request for training data, images of specified conditions are retrieved (S143). Here, retrieval from among images that are stored in the image DB 21 is based on conditions (specify conditions) conferred at the time of a request for retrieval of training data. Once image retrieval is finished, image transmission, acquisition of the learning time and date information, and history management, are performed (S145). Here, images that have been retrieved are transmitted to the originator of the request, such as the learning section 25. Also time information of retrieval for learning is acquired, and information such as time and date information is stored as history. If history management etc. has been performed in step S145, processing returns to step S91 and the previously described operations are executed.

Returning to step S141, if the result of determination in this step is that there is not a retrieval request for training data, it is next determined whether a specified time has elapsed from the previous learning (S151). As was described previously, if time passes after generating an inference model using deep learning, there may be cases where conditions change and reliability of the inference model is lowered. In this step, therefore, determination is based on passage of time after performing deep learning, based on history etc. that was stored in step S145.

If the result of determination in step S151 is that a specified time has elapsed from the previous learning, retrieval is performed again with the previous (request) conditions (S153). Here, a population is generated with conditions at the time of having performed deep learning at the time an inference model was obtained that satisfied specified conditions previously. Accordingly, with this system it is preferable to store what type of request the previous request was and at what sort of time the request was generated. In order to do this, information may be stored for each user in a storage section of the image management device. It may also be made possible to determine based on information stored on the user side that has received.

If retrieval has been performed again, it is next determined whether or not upper data is changing (S155). Here, it is determined whether or not upper data of the population that was retrieved in step S153 is changing.

If the result of determination in step S155 is that the upper data is changing, update is recommended (S157). In this case, since content of the population is changing significantly, the possibility of the inference model becoming no longer optimum is high, and there is a likelihood that reliability of the inference results will also become low. Update is therefore recommended to the user of the camera 10. This recommendation for update may be received by the camera 10 in S73 and S81 of FIG. 6, and the recommendation subjected to recommendation display, and may be automatically performed like the confirmation in S63. If update has been recommended in step S157, or if the result of determination in step S155 was that there is no change to upper data, processing returns to S91 and the previously described operations are executed.

Returning to step S151, if the result of determination in this step is that time has passed from the previous learning, it is next determined whether or not a number of likes has risen sharply (S161). If an inference model that is suitable for the user of the camera 10 to shoot images that will be evaluated with a like is being used, the number of likes will have an effect on generation of an inference model. Specifically, if third-party preferences change, images that receive a sharp rise in the number of likes will appear.

If the result of determination in step S161 is that the number of likes has risen sharply, it is next determined whether or not there is a learning history for similar followers (S163). Even if the number of likes has risen sharply, there may be cases where an inference model is generated that targets images that have a sharp rise in the number of likes, or there may be cases of images that the user is not at all interested in. This is because there are cases where new images demanded by the times (matching the preferences of many people) are uploaded and evaluated extremely well, such as a viewer's likes and dislikes having changed suddenly as a trend, the number of viewers having new likes and dislikes having suddenly increased on SNS, and the like, which means that old learning has become obsolete. For example, if a request is "photographs that receive evaluation from French girls in their 20s", then even if there is a sharp rise in the number of likes, if there are images that French girls react to they should be taken in to consideration. However, even if Japanese men have locally liked an image, it will not be content that should be made a subject of this user's request. Therefore, for images that are similar to images that have had a sharp rise in the number of likes, it is determined whether or not there is a history that has been learned.

If the result of determination in step S163 is that there is learning history for similar followers, update is recommended (S165). For similar followers there has been previous learning, and so update is recommended. If update has been recommended in step S165, or if the result of determination in both step S161 and S163 was No, processing returns to S91 and the previously described operations are executed.

In this way, in the flow for image management, if there has been upload of images (S121), and there has been an image browse request (S131), respective images are stored and displayed. Also if there has been a training data retrieval request (S141), retrieval is performed in accordance with the request. Further, it is determined whether or not to recommend update, in accordance with elapsed time from previous learning (S155). It is also determined whether or not to recommend update in accordance with change in the number of likes (S163).

It should be noted that the DB management section 24b of the external image DB 21 determines whether or not to recommend update, as in steps S151 to S165 of the image management. However, determination in this flow may also be performed by the learning management section 29b of the learning section 25.

As has been described above, in the second embodiment a camera is adopted as the image acquisition device, and the learning management sections 17B and 29B are arranged inside the camera 10 and the external unit 20. This means that by confirming whether or not update of the inference model is necessary at specified times and under specified conditions it is possible to maintain an optimum inference model. It should be noted that the learning management sections 17B and 29B may be arranged within either one of the camera 10 and the external unit 20.

In the second embodiment of the present invention description has been given using FIG. 5A to FIG. 8B, but there is a close relationship with other embodiments, and there may be cases where the technical ideas that have been explained for other embodiments may be used directly or used in slightly modified form. Drawings of the other practical examples may be referred to for describing such sections being applied by sharing technical ideas. However, in order to avoid redundancy regarding duplicated sections that have been described in the other sections, repeated description will be omitted. Specifically, there may be cases where for this embodiment sections that are closely related to other embodiments are described with drawings other than FIG. 5-FIG. 8B as substitutes. As one example, a drawing showing how inference results are verified, as in FIG. 1A, or FIG. 1B showing how an inference model is constructed, can be considered to provide the basis for all embodiments, and so repeated description is not given.

Next, a third embodiment of the present invention will be described using FIG. 9A to FIG. 12B. This embodiment is also an example that has been applied to a camera, as an image acquisition device comprising a learning system. An inference model such as in FIG. 1B that has been acquired by machine learning, or an inference engine that uses that inference model, has been obtained by learning based on previous learning results, regardless of whether or not there is training data. Therefore, there is a possibility of performing unforeseen inference due to the fact that there are differences between previous and current conditions, or differences in conditions between an assumed scene and a scene that is actually used. It is therefore preferable to perform appropriate maintenance. With this embodiment, by assuming such conditions, optimum inference is made possible while performing appropriate maintenance on the basic concepts described in FIG. 1A.

With the first embodiment, guidance when inserting the industrial endoscope 301 into the pipe 311 was performed using an inference model. In the first embodiment if a user continued to ignore a warning that displayed guidance, the inference model was updated by performing relearning. In the second embodiment, shooting guidance for the user to shoot images that will be evaluated by a third party was performed using an inference model. Whether or not this inference model is to be updated is confirmed at a specified time (or under specified conditions), and if reliability of the inference model as lowered relearning is requested to the learning device, and the result of this learning was updated in the new inference model that has been obtained. With the third embodiment also, whether or not this inference model is to be updated is confirmed at a specified time (or under specified conditions), and if reliability of the inference model has lowered relearning is requested to the learning device, and the result of this learning is updated in the new inference model that has been obtained. Compared to the second embodiment, the third embodiment differs in the point that a predetermined plurality of inference model are prepared.

Figure 9A:
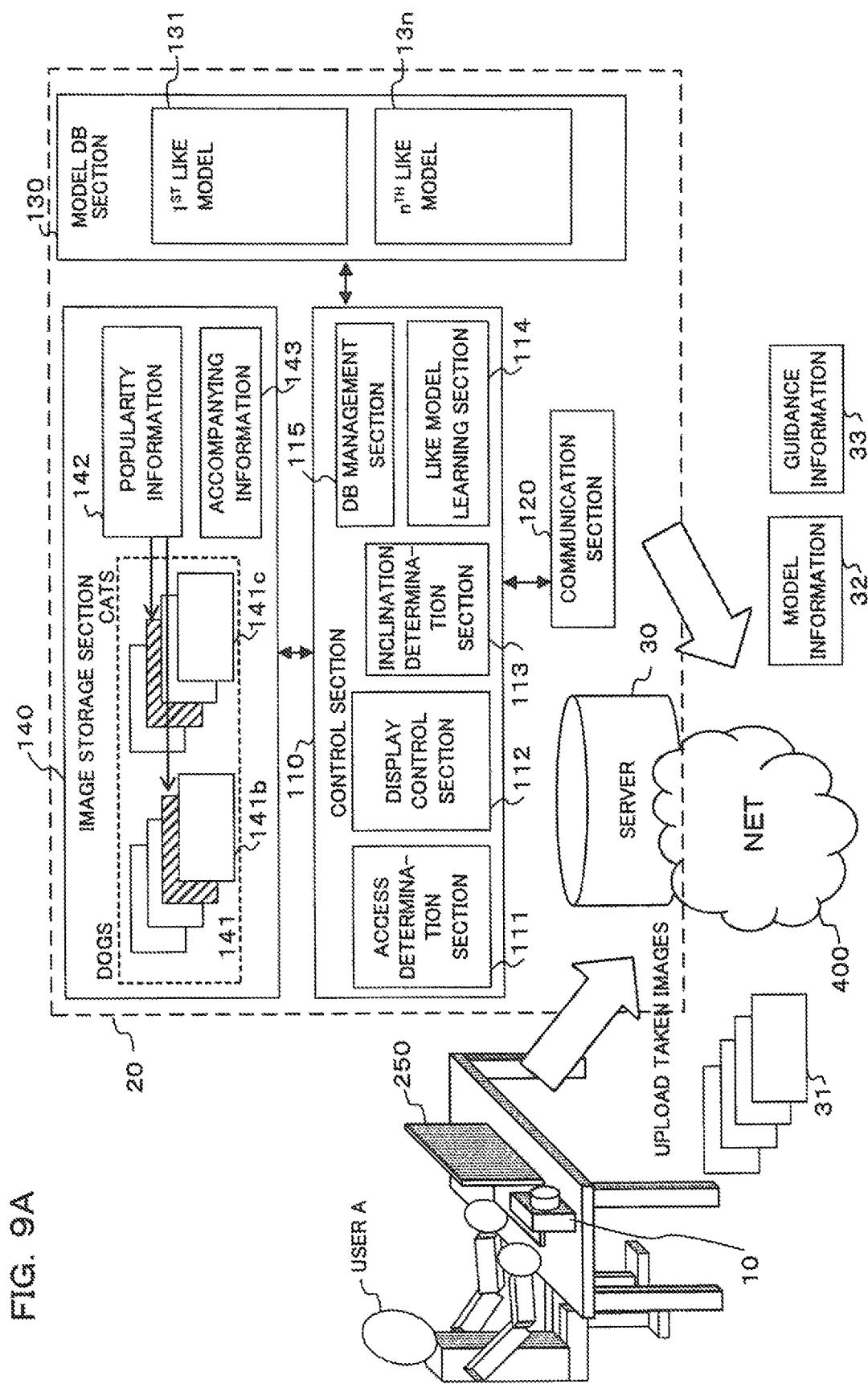
FIG. 9A and FIG. 9B are block diagrams mainly showing the electrical structure of a learning system of a third embodiment of the present invention.
Figure 9B:
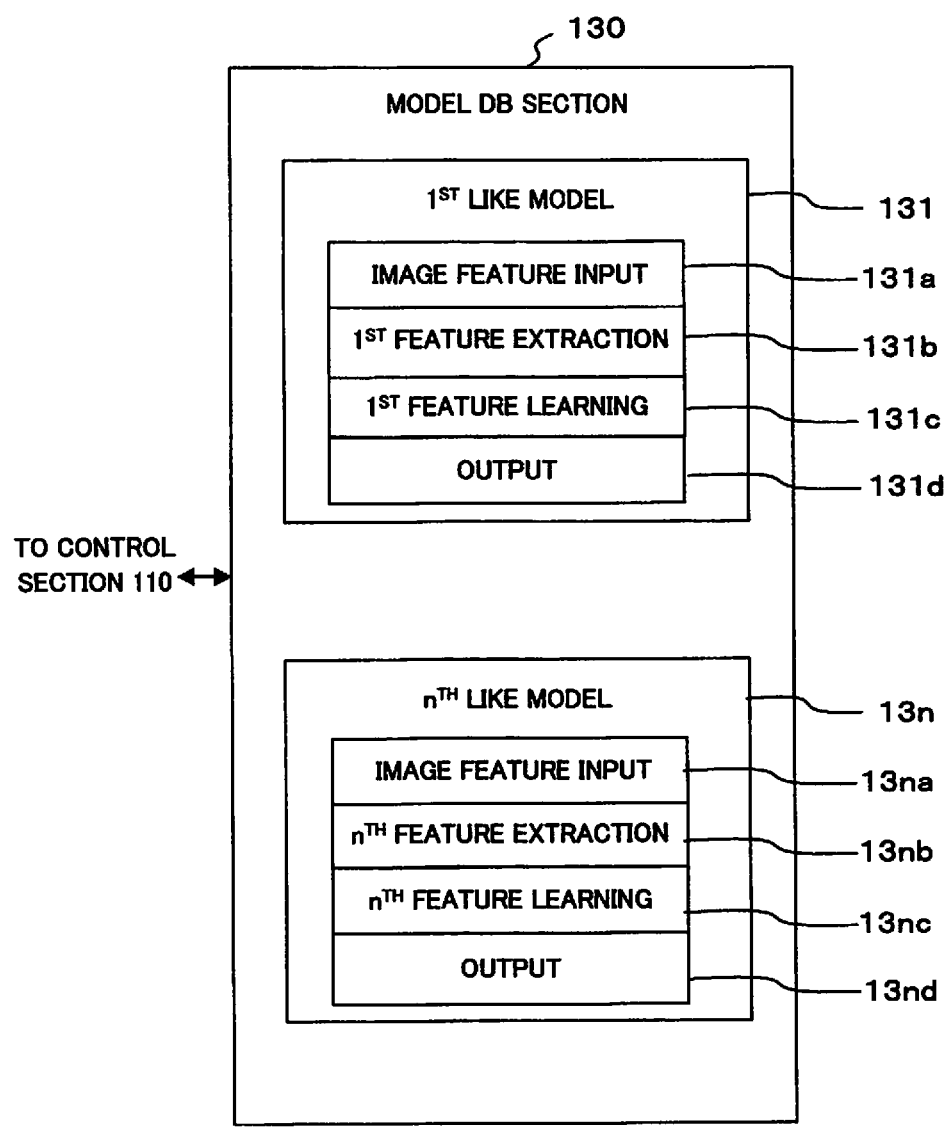
Figure 10:
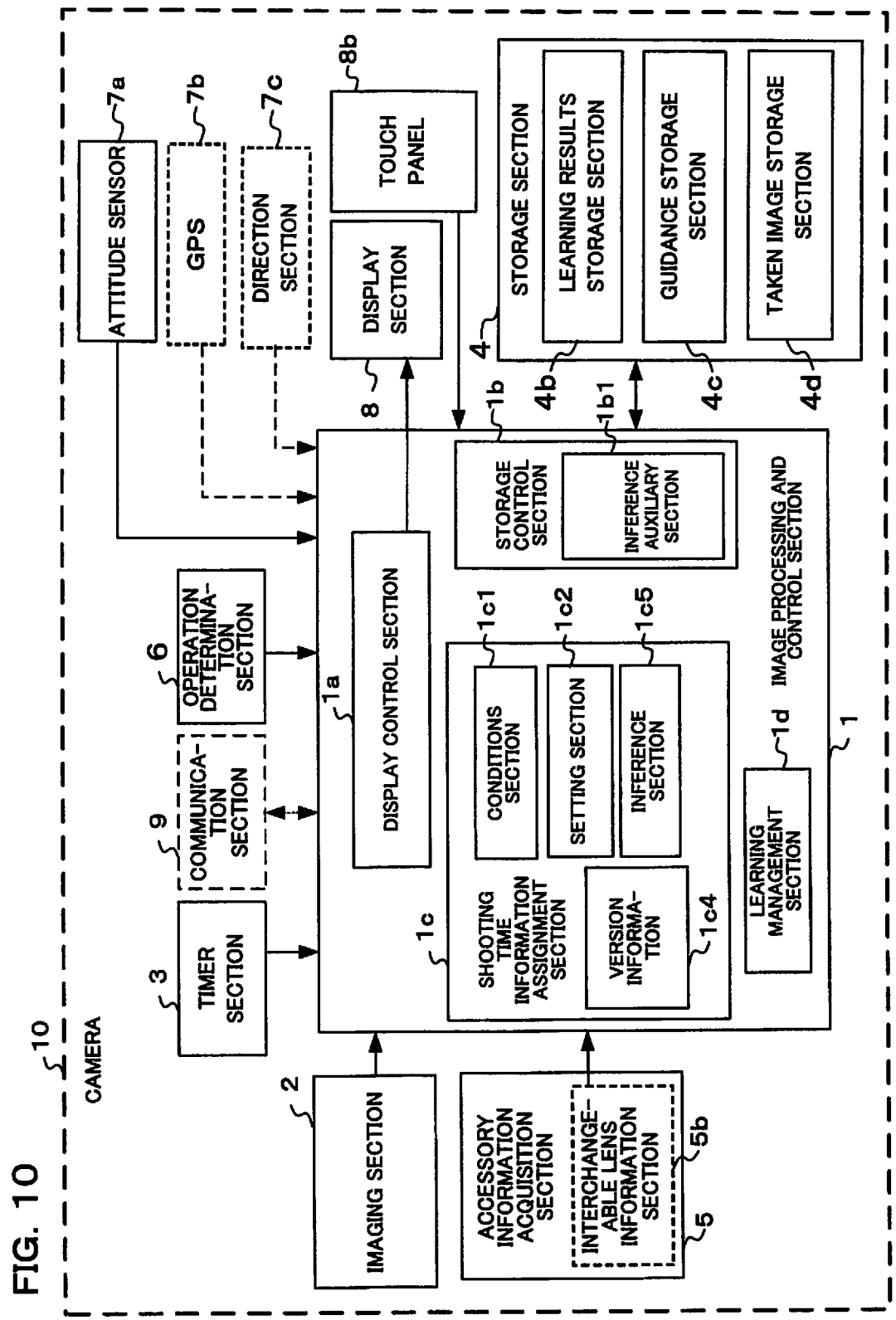
FIG. 10 is a block diagram mainly showing the electrical structure of a camera of the learning system of the third embodiment of the present invention.

FIG. 9A and FIG. 9B are a block diagrams mainly showing the electrical structure of a learning system of the third embodiment. This learning system also comprises a camera 10 and an external unit 20. Detail of the external unit 20 is shown in FIG. 9A and FIG. 9B, while detail of the camera 10 is shown in FIG. 10. The external unit 20 may be a public server for images managed by each operator. This server may publish images without restriction, and may restrict a publication range in a case of publishing to members only etc. (the range of publication is the same as for the second embodiment). An image storage section 140, model DB 130, and control section 110 may be arranged within the same unit, and these third parties may cooperate with each other by means of communication. Also, a plurality of the image storage sections 140 may be provided, and the control section 110 may access image data within the plurality of external image storage sections 140 by means of a communication section 110, to acquire information relating to image data.

The external unit 20 comprises the control section 110, communication section 120, model database (model DB) 130, and image storage section 140. Each of the sections 110 to 140 within the external unit 20 may all be provided within a server 30, and some sections among each of the sections 110 to 140 within the external unit 20 may be provided within the server 30 while other sections may be provided in an external server etc.

An access determination section 111, display control section 112, inclination determination section 113, like model learning section 114, and database (DB) management section 115 are provided in the control section 110. The control section 110 is a processor having a CPU (Central Processing Unit), peripheral circuits and a memory etc., and the CPU performs control of each section within the external unit 20 in accordance with a program that has been stored in memory. Each of the sections 110 to 140 within the external unit 20 is realized mainly by a program, but some or all of these sections may be realized using hardware circuits.

The access determination section 111 determines whether or not there has been access to the external unit 20 from a personal computer (PC) 250 that is used by a user A. The display control section 112 controls display at the time of displaying images that have been stored within the image storage section 140 on the PC 250, and at the time of displaying results that have been learned by the like model learning section 114, on the PC 250, etc.

The inclination determination section 113 analyzes image data that is stored in the camera 10 (or PC 250), and determines inclination of images of the user A. For example, inclination of taken images is determined from various viewpoints such as photographed object, position of photographed object, size of photographed object, shooting direction (whether it is sideways, a front view, shooting upwards etc.), focal length at the time of shooting, exposure control values etc. Also, if inclination of images of the user A has been determined, the inclination determination section 113 retrieves a like model that is closest to the inclination of the images of the user A from a $1^{st}$ like model to an $n^{th}$ like model stored in the model DB 130, and transmits this retrieved like nice model to the PC 250.

The like model learning section 114 comprises an input layer I, intermediate layers N11 to N2$n$, and an output layer O, as was shown in FIG. 1B, and outputs inference models. Specifically, similarly to the previously described input output modeling section 28, the like model learning section 114 performs deep learning and generates an inference model for acquiring liked images. As was described previously, liked images are images that have been given a high evaluation such as like by a third party, for images that have been uploaded to the Internet or the like.

The like model learning section 114 also creates guide information 33. The guide information 33 is advice for making images having a high evaluation by third parties, when it is predicted that a through image will not be evaluated highly by third parties, when performing through image display and display of inference results, on the display section 8 of the camera 10. This guidance display 33 issues instructions in accordance with difference between inference results and a through image. For example, in a case where a result of inference is that focal length becomes wide-angle side with a through image despite the telephoto side being preferred, this difference in focal length constitutes shooting guidance information. Also, in a case where an inference result is such that with a through image aperture is narrowed to give a deep depth of field compared to a desired shallow depth of field with the aperture wide open, this difference in aperture value constitutes shooting guidance information. This guide information 33 may also be generated by deep learning. The guide information 33 may also be examples of images that have received a high evaluation from third parties (sample images).

A large number of images that are input for learning by the like model learning section 114 are acquired by being linked with information such that it will be understood what type of evaluation will be received for each image. This means that the like model learning section can also perform deep learning for differences in image quality, composition, expressions, and color cast etc. between images with a good evaluation and images with a bad evaluation. Obviously machine learning may also be performed, noting specified relationships.

The DB management section 115 creates a population from among image data stored in the model DB 130 if a request for relearning is received from the camera 10, and generates inference models by performing relearning in the like model learning section 114. Also, the function of confirming whether or not to perform inference, that is performed by the learning management section 1d of the camera 10 or the like model learning section 114 of the external unit 20, may be fulfilled by the DB management section 115.

The communication section 120 has a communication circuit, and can perform communication with the PC 250 by means of a network 400. It should be noted that the camera 10 may also be connected to directly by means of communication. By means of the communication section 120 taken images 31 are acquired from the PC 250 (upload of taken images), and model information (inference model) 32 that has been generated by the like model learning section 114 is transmitted to the PC 250. Guide information 33 for displaying advice in order to shoot images based on model information 32 is also transmitted to the PC 250. The PC 250 that has received the model information 32 and the guide information 33 can output an inference model and guide information to the camera 10.

The image storage section 140 is an image database (DB), and it is possible to store images that have been taken by many users, not just those of user A, in the image storage section 140. With the example shown in FIG. 9A, image data 141 is classified and divided into dog images 141b and cat images 141c etc., and many images are stored in the image storage section 140. Specifically, image data that is stored in the image database is classified and divided. Classification and division is an example, and there are various other classifications.

Popularity information 142 is associated with images among the respective images 141b and 141d that have "like" affixed. Also, in a case where shooting information (for example, EXIF (Exchangeable Image File Format) information) etc. and popularity information 142 has been associated as accompanying information 143, various information such as image contributor information, profile information of people who have appended "like", follower information etc. is associated.

A $1^{st}$ like model 131 to $n^{th}$ like model 13n are stored in a model database (DB) 130. Like models that are stored in this model DB 130 are inference models that have already been learned by the like model learning section 114.

Image feature input 131a, $1^{st}$ feature extraction 131b, $1^{st}$ feature learning 131c and output 131d are stored in the $1^{st}$ like model 131, as shown in FIG. 9B. This $1^{st}$ like model 131 corresponds to the learning model that was shown in FIG. 1B. The $1^{st}$ image feature inputs 131a, 13na are features of images that have been input to the input layer I. The $1^{st}$ feature extractions 131b, 13nb are information such as position, brightness, color etc. of pixels that has been extracted from within the image data that has been input to the input layer I. The $1^{st}$ feature learnings 131c, 13nc are strengths (weights) of connections between each neuron. The outputs 131d, 12nd store results of deep learning. As was described previously, the inclination determination section 113 references inclination of images stored in the camera 100 of the user A, retrieves a like model that is close to user A's preference and recommended to the user A, and transmits this like model to the PC 250.

Next, the structure of the camera 10 will be described using FIG. 10. The camera 10 comprises an image processing and control section 1, an imaging section 2, a timer section 3, a memory 4, an accessory information acquisition section 5, an operation determination section 6, a sensor such as an attitude sensor 7a, a display section 8, and a communication section 9.

A display control section 1a, storage control section 1b, and shooting time information assignment section 1c are provided in the image processing and control section 1. The image processing and control section 1 is a processor having a CPU (Central Processing Unit), peripheral circuits and a memory etc., and the CPU performs control of each section of the camera 10 in accordance with a program that has been stored in memory. Also, each of the sections 1a to 1c within the image processing and control section 1 is realized mainly by a program and peripheral circuits, but all of these sections may also be realized using peripheral circuits. The image processing and control section 1 also has an image processing circuit, and performs image processing on image data that has been input from the imaging section 2.

The display control section 1a has a display control circuit, and performs display control when performing various image display on the display section 8, such as through image display based on image data from the imaging section 2, playback display based in image data that has been stored in the taken image storage section 4d within the memory 4, display of results of inference that uses an inference model that has been stored in the learning results storage section 4b, guidance display that has been stored in the guide storage section 4c, etc.

The storage control section 1b has a storage control circuit, and performs control of storage, such as of image data to the memory 4. Specifically, taken images are stored in a taken image storage section 4d. Also, an inference auxiliary section 1b1 stores model information (inference model) 32 that has been transmitted from the external unit 20 in a learning results storage section 4b, and stores guide information 33 in a guide storage section 4c. Also, in a case where advice is adopted when the camera 10 has performed inference using an inference model, these items of information are also stored (refer to S191 in FIG. 11A).

The shooting time information assignment section 1c has a condition section 1c1, a setting section 1c2, version information 1c4, and an inference section 1c5. The condition section 1c1 acquires information that indicates various shooting conditions, such as shooting information of the camera 10, for example, focal length, focal position, exposure control values (aperture value, shutter speed value, ISO sensitivity value etc.), type of subject, size of subject, state of subject exposed to light, fitting/usage conditions of an accessory, etc.

The setting section 1c2, similarly to the setting section 16 of FIG. 5A, sets request information that is associated with themes for which the user A want to receive a like evaluation. This request information that has been set is transmitted to the external unit 20 by means of the communication section 9. The like model learning section 114 of the external unit 20 performs deep learning based on this request information, and transmits an inference model of learning results to the camera 10 (refer to S211 and S231 in FIG. 11B). Also, features etc. of images at the time of this inference at this time are stored in the model DB 130 as an $n^{th}$ like model. The version information 1c4 is accessory version information of an interchangeable lens or the like, for example.

The inference section 1c5, similarly to the inference engine 12 of FIG. 5A, performs inference using an inference model from the external unit 20. Inference results of inference that has been performed during through image display are displayed on the display section 8. It becomes possible for the user A to shoot pictures in line with the intention that has been set by the setting section 1c2, by taking into consideration the inference results. The inference section 1c5 functions as an inference engine (inference section) that determines whether or not image data that has been input by an image input section has been evaluated from a third party, using an inference model that has been received by a receiving section.

The learning management section 1d, similarly to the learning management section 17B (refer to FIG. 5A), monitors inference results that used the inference model, and issues a relearning request to the learning device. In a case where confirmation as to whether or not relearning is necessary has been instructed manually by the user also, this confirmation operation is performed (refer to S183 and S185 in FIG. 11A).

The imaging section 2, similarly to the image input section 11 of FIG. 5A, has a photographing lens, image sensor, imaging control circuit, and image data processing circuit, etc., and generates image data of a subject. This image data is subjected to image processing in the image processing and control section 1. Also, the imaging section 2 outputs information such as angle of view information and distance information of a photographing lens to the image processing and control section 1. These items of information are used when the condition section 1c1 determines shooting conditions. It should be noted that in a case where a photographing lens fitted to the camera 10 is an interchangeable lens, interchangeable lens information 5b may also be input.

The accessory information acquisition section 5 has the interchangeable lens information section 5b. The interchangeable lens information section 5b has focal length information, focal position information, aperture value information, and version information etc. of the interchangeable lens. Besides interchangeable lens information, there may also be camera accessory information, such as, for example, information on an attached strobe unit. The accessory information acquisition section 5 transmits information that has been acquired to the image processing and control section 1. The condition section 1c1 determines conditions using the information that has been acquired also.

The timer section 3 has a clock function and a calendar function. Image data that has been output from the imaging section 2 has date and time information etc. associated with it.

The communication section 9 has a communication circuit, and can perform communication with the PC 250. By means of the communication section 9, taken images are transmitted from the camera 10 to the external unit 20 either directly or indirectly, and model information 32 and guide information 33 is received. The operation determination section 6 determines operating state of various operation member such as a release button, dial, operation button etc., and determination results are output to the image processing and control section 1. The communication section 9 functions as a transmission section that transmits shooting conditions and/or images that have been stored in the image storage section to the learning device. The communication section 9 functions as a reception section that receives an optimal inference model that has been selected from among inference models that have been generated by the learning device, based on shooting conditions and/or images that have been stored in the image storage section.

The attitude sensor 7a may be an acceleration sensor, Gyro etc., and detects attitude of the camera 10. A GPS (Global Positioning System) 7b measures position of the camera 10 using a satellite navigation system. A direction sensor 7c has a compass, and detects direction in which the photographing lens of the camera 10 is facing. Outputs of the attitude sensor 7a, GPS 7b, and direction sensor 7c are output to the image processing and control section 1, and the condition section 1c1 determines conditions of the camera 10 based on these sensor outputs. All of the attitude sensor 7a, GPS 7b and direction sensor 7c may be provided, but some of them may also be omitted.

The display section 8, similarly to the display section 15 of FIG. 5A, has a display such as a display panel, and performs display based on image data that was acquired in the imaging section 2. The display section 8 also performs display of inference results of the inference section 1c5. Display may also be performed based on guide information that has been stored in the guide storage section 4c. Display may also be performed of requests that have been set in the setting section 1c2, as shown in FIG. 5B. A touch panel 8b is provided on the front surface of the display section 8, and detects the user A touching the display surface of the display section 8. Touch detection results are output to the image processing and control section 1.

The memory 4 has a learning results storage section 4b, guide storage section 4c, and taken image storage section 4d. The learning results storage section 4b stores results (inference models or interim inference models) that have been set by the setting section 1c2 and subjected to deep learning by the like model learning section 114. Learning results (inference models) that have been recommended by the inclination determination section 113 in accordance with conditions of the camera 10 that have been output by the condition section 1c1 are also stored.

The guide storage section 4c stores guide information 33 that has been transmitted from the external unit 20. This guidance display stores data for performing guidance display that constitutes reference to the user A, when executing an inference model that has been generated as a result of deep learning having been performed by the like model learning section 114. As guidance display, besides advice at the time of the shooting operation, such as exposure control values and focal length etc., there may be sample images such as would receive an evaluation of "like".

It should be noted that some or all of the peripheral circuits of the CPU within the control section 110 and the image processing and control section 1 may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits. Also, some functions of the CPU may be implemented by circuits that are executed by program code such as a DSP, may use a hardware structure such as gate circuits that are generated based on a programming language described using Verilog, or may be executed using hardware circuits.

Next, operation of the learning system of this embodiment will be described using the flowcharts shown in FIG. 11A to FIG. 12C.

Figure 11B:
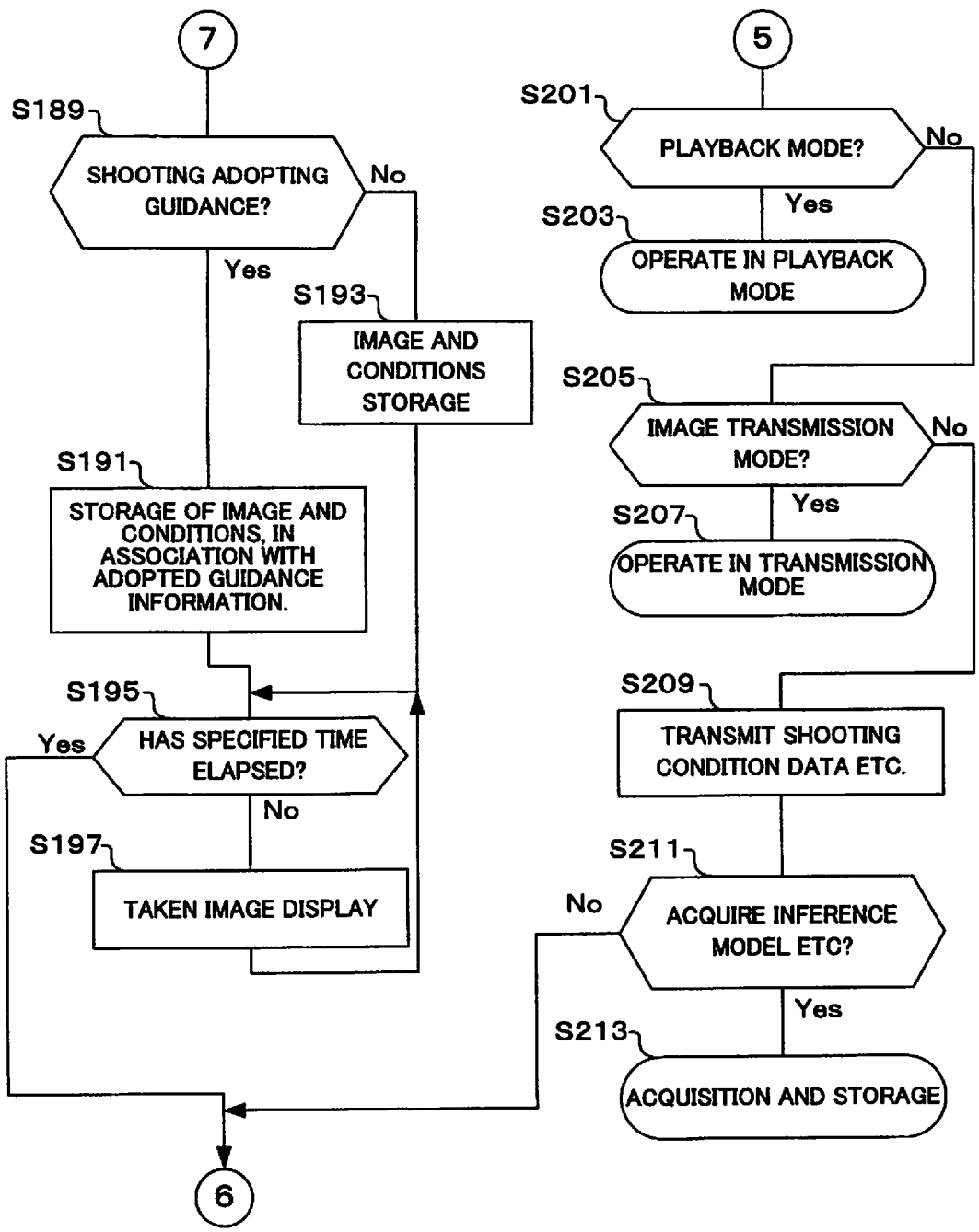

The flowcharts shown in FIG. 11A and FIG. 11B show operation of the camera 10, and these flowcharts are executed by the image processing and control section 1 in accordance with a program that has been stored in memory. If the processing flow for camera control is commenced, it is first determined whether or not the camera is in shooting mode (S171). With this embodiment, shooting mode is the default mode and if another mode has not been set using an operation member or the like shooting mode is determined.

If the result of determination in step S171 is shooting mode, next various sensors are activated, and accessory determination is performed (S173). Here, sensors such as the attitude sensor 7a, GPS 7b, and direction sensor 7c, are activated, and sensor detection results are input. It is also determined whether or not an accessory (for example, an interchangeable lens) is attached to the camera 10, using the accessory information acquisition section 5. Various information such as focal length is acquired from the interchangeable lens.

Next imaging is carried out, and a through image is displayed (S175). Here, image data is acquired by the imaging section 2, the image processing and control section 1 performs image processing, and a through image is displayed on the display section 8.

Next, inference is performed (S177). As will be described later, since an inference model that has been generated by the like model learning section 114 is received from the external unit 20 (refer to S213), in this step the inference section 1c5 performs inference using the inference model that has been received. The inference here determines, for example, whether or not, under a request (conditions) that has been set by the user A, there is a possibility of an image that is being subjected to through image display receiving a high evaluation (an evaluation of "like") from a third party.

If inference has been performed, it is next determined whether or not specified conditions are matched (S179). Here it is determined whether or not through image display or an accessory (for example, an interchangeable lens) matches specified conditions (request) that have been set by user A.

If the result of determination in step S179 is that specified conditions have been matched, corresponding guidance UI (User Interface) display is performed (S181). Here, in the event that result of inference by the inference section 1c5 is that it is expected that a high evaluation (evaluation of "like") will be received from a third party, then the fact that "conditions that have been set by user A have been matched and there should be an evaluation of "like"" is displayed on the display section 8 together with the through image. Also, the matching of the conditions may not be a perfect match.

In this case, guidance display may be performed for shooting in order to achieve a perfect match.

On the other hand, if the result of determination in step S179 is that specified conditions are not matched, the fact that the conditions are not matched is not expressly displayed. However, in the case where an evaluation of "like" is not likely, display may be formed based on guide information 33 stored in the guide storage section 4c. As guide information for this case, advice may be given so as to indicate what type of shooting will result in an evaluation of "like" in the case of this theme. For example, a difference between an image that will be evaluated as like and the current through image may be made the advice display. Specifically, aperture value, shutter speed value, shooting direction, focal length etc. are displayed in order to shoot an image that is similar to an image that is evaluated as like. Sample images that have been evaluated as "like" may also be displayed.

If corresponding guide UI display has been performed in step S181, or if the result of determination in step S179 is that specified conditions have not been matched, whether or not user guidance has been adopted is next determined (S183). As was described previously, user guidance is displayed on the display section 8 based on inference results for step S177. Even in the event that there is an incomplete match to specified conditions, or if there is no match, shooting guidance is issued so as to receive evaluation by third parties. However, in this type of case, there may be cases where the user ignores the guidance, or shooting that is different to the guidance is performed. In this step determination is for whether or not the user has adopted the guidance that was displayed on the display section 8.

If the result of determination in step S183 is that the user guidance has not been adopted, learning of reformed training data is requested (S185). The fact that the user has not adopted the guidance is presumed to be that inference does not match the current situation. Therefore, new training data is created in the DB management section 115 of the external unit 20 and there is a request to perform relearning in the like model learning section 114. It should be noted that there may be cases where the external unit 20 performs deep learning using training data that has been reformed in advance for generating an inference model, and stores the inference model in the model DB section 130. In this case an inference model stored in the model DB 130 is selected without performing relearning, and transmitted to the camera.

If learning is requested with training data reformed in step S185, or if user guidance has been adopted as a result of determination in step S183, it is next determined whether or not to perform shooting (S187). Here, determination is based on whether or not the release button of the camera 10 has been pressed fully. When determining whether or not to perform shooting, the user A can reference the corresponding guide UI display of step S61. If the result of this determination is not shooting, processing returns to step S171 and the previously described operations are executed.

If the result of determination in step S187 is shooting, it is next determined whether or not to perform shooting by adopting advice (S189). If the user A will perform shooting in accordance with the corresponding guide UI display that has been displayed in step S181, display to that effect is performed using an operation member or a touch panel. Alternatively, in the event that it can be judged, based on outputs of various sensors and/or operating states of operation member etc., that aperture, shutter speed, shooting direction, focal length etc. have been performed in accordance with corresponding guide UI display, it may be determined that advice has been automatically adopted.

If the result of determination in step S189 is that advice has been adopted, the inference auxiliary section 1b1 stores an image and conditions at that time, and also adopted guidance information associated therewith, in the memory 4 (S191). In this case, an image and shooting conditions are stored, and advice that has been adopted (guide information) is stored in association with the image. By accumulating results as to whether or not advice has been assimilated, it is possible to determine advice that the user of the camera 10 likes and advice that they do not like. Advice that has not been adopted can be considered to have a content that is difficult for the user to assimilate. Since this type of unwanted advice is often of no interest to that user, when similar conditions arise subsequently, the same advice should not be displayed.

Also, if what type of inference model has been used is stored in step S191, it is possible to store whether that image was acquired based only own judgement of quality, or by following guidance, as evidence. As a result, despite the fact that shooting has been performed in line with guidance, in cases such as where evaluations become low it is preferable to perform new learning. By doing this it is possible to trigger reforming of learning that is a characteristic of this embodiment. Specifically, even if many of such images have been posted, in a case where like evaluations have not been received it can be considered that this inference model has become obsolete, or it can be considered that there was never good training data in the first place.

On the other hand, if the result of determination in step S189 is that advice has not been adopted, an image and conditions are stored (S193). By storing images and conditions for which advice has not been adopted, it is possible to refer to them at the time of the next inference. It should be noted that the request for relearning in step S185 may also be executed in this step S193. By storing these types of conditions, it is possible to determine an inference model that the user requires, or to reflect this in how to create a population of training data that is required. Also, if no like evaluations can be received upon uploading this type of image, this is the user's responsibility, and constitutes reference data for the next determination that it would be better to use an inference engine to be performed by the camera or external device.

If storage has been performed in step S191 or S193, it is next determined whether or not a given time has elapsed (S195). After shooting, it is determined whether or not a given time has elapsed, for example, whether or not a so-called Quickview Display time has elapsed. If the result of this determination is that a given time has not elapsed, an image that was taken in step S187 is displayed on the display section 8. On the other hand, if the result of determination is that a given time has elapsed, processing returns to step S171 and the previously described operations are executed.

Returning to step S171, if the result of this determination is not shooting mode, it is determined whether or not it is playback mode (S201). Playback mode is a mode for subjecting taken images that have been stored in the memory 4 to playback display on the display section 8. Playback mode is executed by the user A selecting playback mode by operating a playback button or the like. If the result of determination in this step is that playback mode has been selected, operation is in playback mode (S203). Once playback mode is completed, processing returns to step S171.

If the result of determination in step S201 is not playback mode, it is determined whether or not it is image transmission mode (S205). Image transmission mode is a mode for transmitting a taken image 31 from the camera 10 to the external unit 20 by means of the PC 250. Image transmission mode is set by the user A operating an image transmission button or the like. If the result of determination in this step is that image transmission mode has been selected (refer to S233 in FIG. 12A), operation is in transmission mode (S207). Once transmission mode is completed, processing returns to step S171.

If the result of determination in step S205 is not image transmission mode, shooting condition data etc. is transmitted (S209). If it is not image transmission mode it will become a remaining mode, namely, inference model acquisition mode. Here, information relating to shooting conditions collected by the condition section 1c1 and images being stored in the storage section is transmitted to the external unit 20 by means of the PC 250. The external unit 20 retrieves an inference model that is most suitable to the user A based on information relating to shooting conditions that has been received, and transmits this inference model to the camera 10. Retrieval of this optimum inference model will be described later using FIG. 12C. It should be noted that, similarly to the second embodiment, the user may create a request, and request learning to the external unit 20.

If shooting condition data etc. has been transmitted, it is determined whether or not an inference model etc. has been acquired (S211). As was described previously, the external unit 20 returns an optimum inference model based on information relating to shooting conditions.

If the result of determination in step S211 is that an inference model etc. cannot be acquired, processing returns to step S171 and the previously described operations are executed. On the other hand, if an inference model etc. has been acquired the inference model etc. that has been acquired is stored in the memory 4 (S213).

Figure 12A:
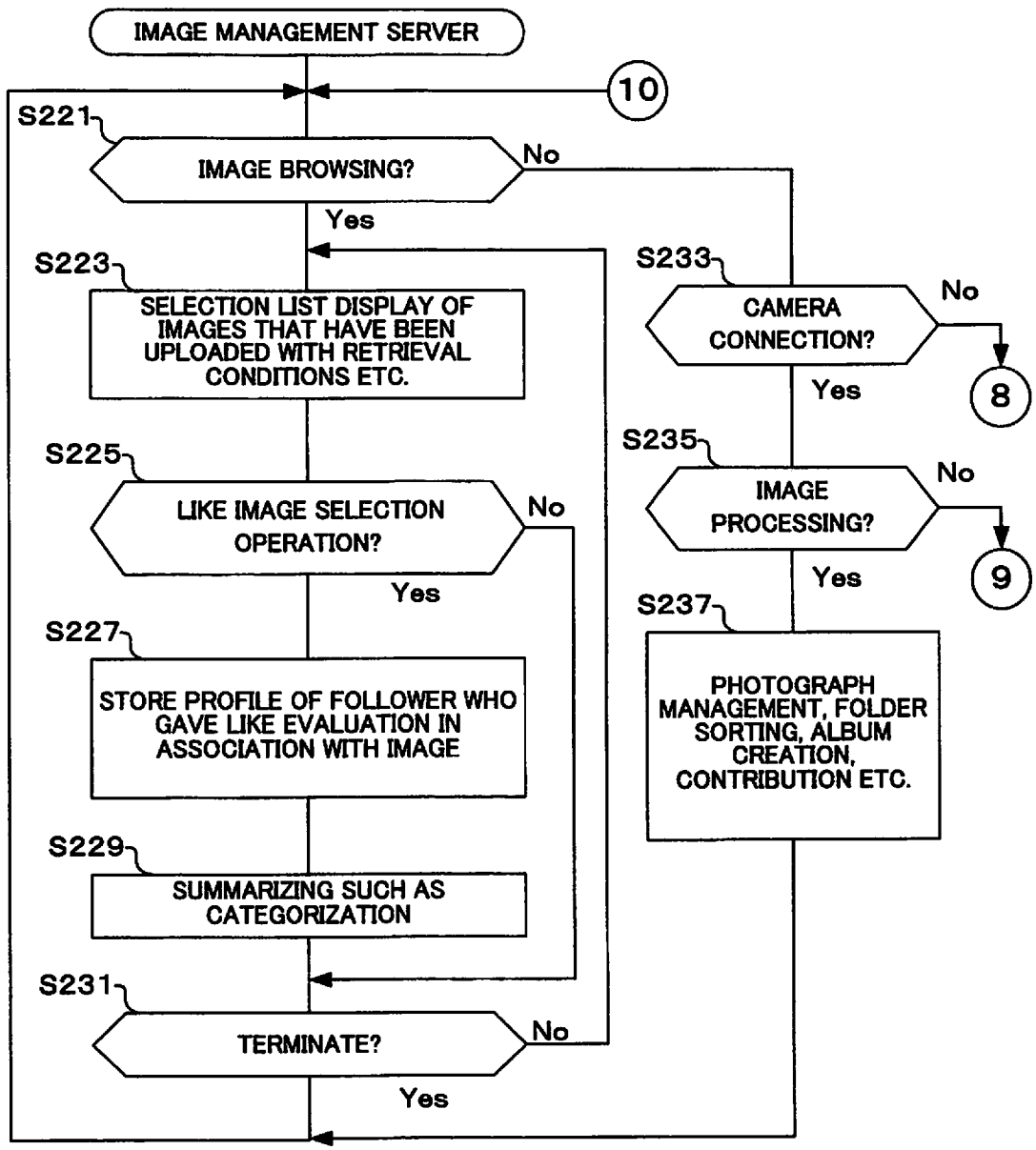
FIG. 12A to FIG. 12C are flowcharts showing operation of an image management server of the learning system of the second embodiment of the present invention.
Figure 12B:
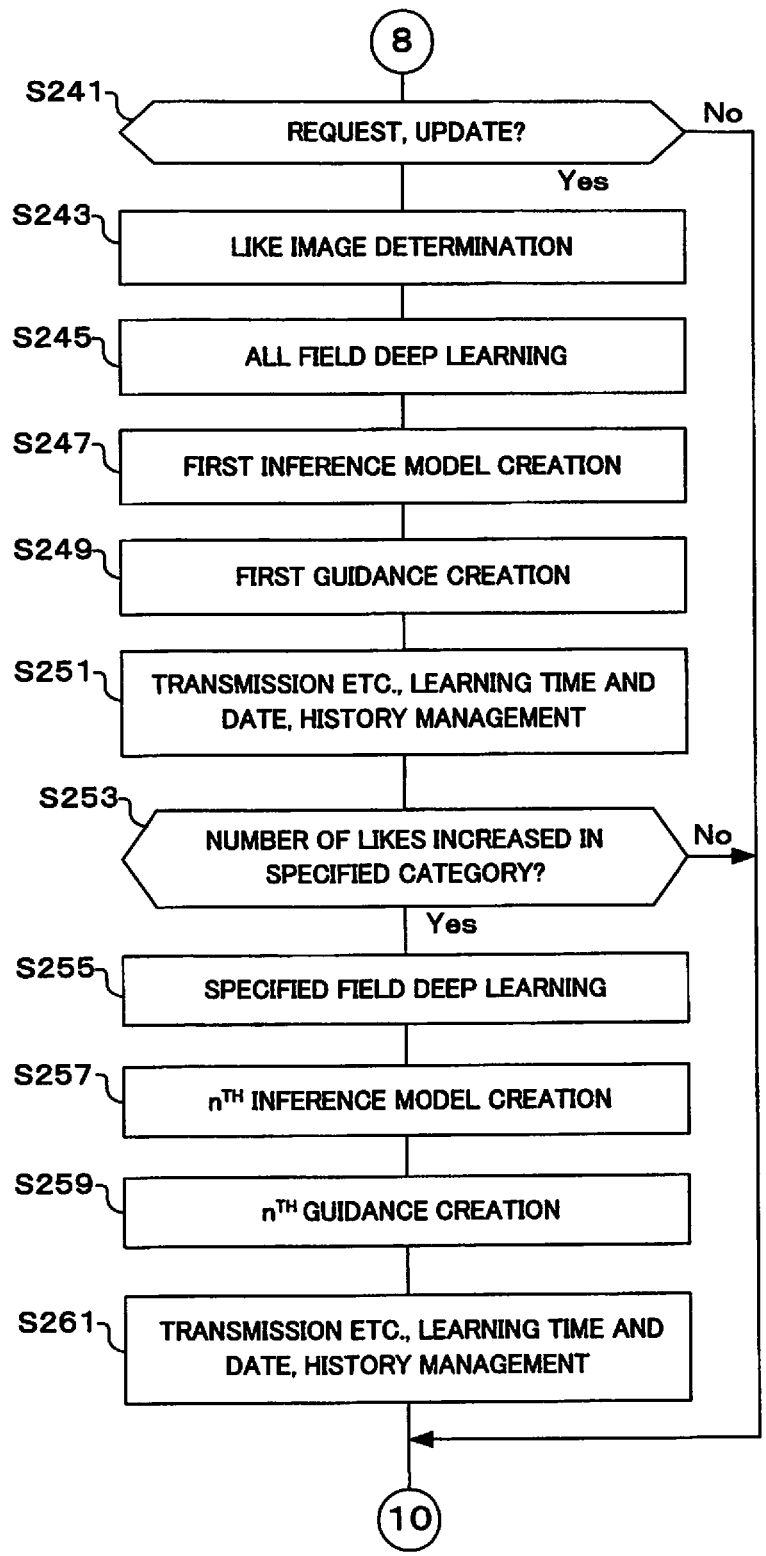
Figure 12C:
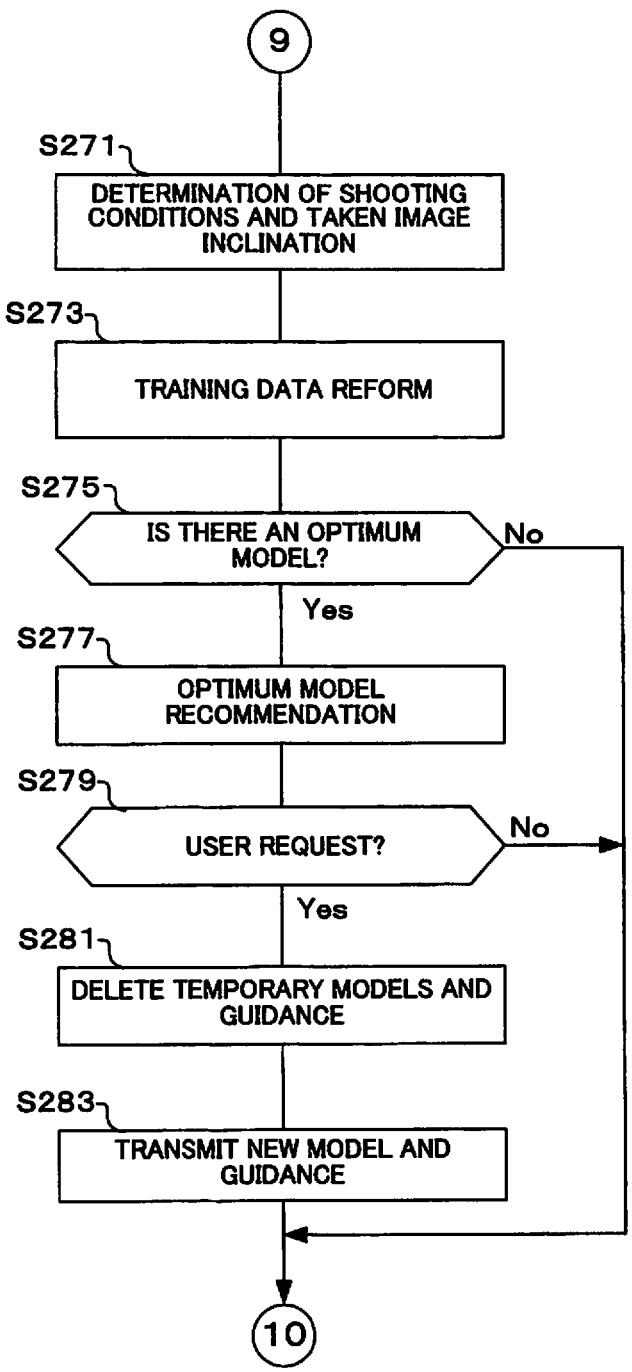

The flowcharts shown in FIG. 12A to FIG. 12C show operation of the external unit 20, and these flowcharts are executed by the control section 110 in accordance with a program that has been stored in memory. If the flow for the image management server is commenced, it is first determined whether or not there is image browsing (S221). There may be cases where the user A wishes to browse images that are stored in the image storage section 140 on the PC 250 or camera 10 etc. In this case there may be accesses to that effect from the PC 250 etc. to the access determination section 111. At the time of access to the image management server, the PC 250 etc. transmits image retrieval conditions etc.

If the result of determination in step S221 is image browsing, images that have been uploaded with search conditions etc. are subjected to selection list display (S223). In this case, retrieval is performed from among images that are stored in the image storage section 140, in accordance with search conditions. If retrieval is completed, after it is possible to list display image that have been selected, the display control section 112 transmits data to the PC 250.

Next, it is determined whether or not there has been a selection operation for a liked image (S225). If there is an image that the user A likes among the images that have been displayed on the display section 8, "like" is clicked and the fact that the image is liked is transmitted. Here it is determined whether or not user A has given an evaluation of "like".

If the result of determination in step S225 is that there has been a selection operation for a like image, association of a profile of the person who selected like, and the image, is performed (S227). Here, a person who selected like (specifically, user A), a person who gave an evaluation of like (namely the person who contributed the image that has been selected), and the image that has been selected, are associated with each other. Since there will be many cases where a specific person will give a like evaluation to images of the specific person, if the profile of the person who selected like and the profile of the person who gave a like evaluation are both stored, it is possible to speculate on a relationship between the two. That is, it is preferable for evaluations to have also taken in to consideration a relationship between the contributing person and the person who gave the evaluation. Further, since there are people that will give high evaluations to any image, and people that will rarely give high evaluation, follower information may also include character etc. of these types of evaluators.

Next, summarizing, such as categorization, is performed (S229). In step S227 a relationship between each image and each evaluator is determined. There may be cases where images that have been evaluated as "like" are being evaluated by various people one after another, and by analyzing these evaluations it will be understood what type of evaluation is received from people with what type of profile. Also, by analyzing evaluators and profiles of those evaluators it is possible to determine what type of classification image they give evaluation to, or to determine what type of image they receive evaluation for. Further, categorization as to what type of image people with this type of common profile have a tendency to like also becomes possible.

In step S229, the control section 110 performs classification etc. using information for which association was performed in step S227, as was described above. Information such as focal length, focal position, aperture value, shutter speed value, photographing lens direction and flash unit usage etc. at the time of shooting is acquired from information that has been attached to an image (for example, Exif information), and classification is based on this information. Classification and division may also be by theme of a photograph, for example scenery, people, food etc., resulting from image analysis. Also, if a profile of a contributor (photographer) is attached to an image, classification and division may also be performed by nationality, gender, age group etc. of the contributor. Also, in the event that comments have been attached to an image, classification and division may be based on these comments.

If summarizing, such as categorization, has been performed, next it is determined whether or not that categorization has been completed (S231). Here the access determination section 111 determines whether or not an access from the user A is completed. If the result of this determination is not completed, processing returns to step S223 and the previously described operations are executed. On the other hand, if the result of this determination is completed, processing returns to step S221 and the previously described operations are executed.

If the result of determination in step S221 is not image browsing, it is determined whether or not there is camera connection (S233). Here it is determined whether or not there is a direct connection from the camera 10, or a connection to the image management server via the PC 250.

If the result of determination in step S233 is that there is a camera connection, it is determined whether or not there is image adjustment (S235). Here it is determined whether taken images that are stored in the image storage section 140 are adjusted, or whether taken images are to be adjusted together with storage in the image storage section 140. Since the user A designates operation content when connected to the external unit 20, determination is based on this operation content.

If the result of determination in step S235 is image adjustment, processing for photo adjustment, folder sorting, album creation, contribution etc. is executed (S237). If the user A wants to have their images browsed by a third party also, image contribution is performed. It is also possible to create a community using SNS etc. for making an environment in which these types of posted images can be easily evaluated. As described previously, when evaluating images, since it is better to also take into consideration interpersonal relationships between evaluators and people who receive evaluation, at this time evaluations are stored together with the profile of user A. By storing profiles, it also becomes possible to eliminate cases where only acquaintances have given an evaluation of "like". However even if this type of "like" is not eliminated, in cases where it is clear that the number of occurrences of "like" is a lot or a few, it is possible to discriminate between images that have been subjectively evaluated and images that have not been subjectively evaluated even if learning has been performed in total. If photograph adjustments etc. have been performed in step S237, processing returns to step S221 and the previously described operations are executed.

If the result of determination in step S233 is that there is not a camera connection, it is determined whether or not there is a request or an update (S241). There are cases, in the camera 10, where transmission of an inference model is requested (S211, S213), and cases where update of the inference model as a result of having performed relearning by reforming a population for inference model generation is requested (S185). In this step it is determined whether or not there has been this type of request, or an update request. If the result of this determination is that there is not a request, processing returns to step S221 and the previously described operations are executed.

If the result of determination in step S241 is that there is a request or an update request, liked image determination is performed (S243). Here, operations to generate an inference model are executed in steps S143 to S261, for a user who is capable of accessing the external unit 20. First, in this step, an image that has received a high evaluation (evaluation of "like") from a third party is extracted from among images that are stored in the image storage section 140. This image is used as an input image (set in the input layer I) at the time of deep learning by the like model learning section 114.

If like image determination has been performed, next deep learning is performed for all fields (S245). Here, generally, deep learning for generating an inference model for images in order to be evaluated as "like" is performed. This deep learning involves adjusting strength and weights etc. of connections between neurons N11 to N2$n$ of intermediate layers so that when images of all fields (population) have been input to the input layer I, like is output from the output layer O, as was described previously using FIG. 1B. The strengths and weights etc. of neuron connections of the intermediate layers that have been adjusted are the inference model. Also, when performing deep learning, shooting conditions are also reflected at the time of inference model creation. This is for using shooting conditions when recommending an optimum inference model (refer to S275).

If deep learning has been performed, a $1^{st}$ inference model is created (S247). Strengths and weights etc. of neuron connections of the intermediate layers when deep learning has been completed are made a $1^{st}$ model, and this model is stored in a model DB section 130. It should be noted that this inference model is a versatile inference model, and in the event that an inference model that is suitable for a specified category is not generated this versatile inference model is transmitted to the external device.

If the $1^{st}$ inference model has been created, next, guidance is created (S249). If the $1^{st}$ inference model has been created, $1^{st}$ guidance information is created in order to make it possible to shoot photographs with this $1^{st}$ inference model. This guidance is created by detecting differences between images that are evaluated and images that are not evaluated. Detection at this time may be detection of differences between using an inference model for learning in order to evaluate input images at the time of shooting and at the time of viewing, and using an inference model for learning which category an input image belongs to. In any event, an inference model may be created that has performed learning so as to detect differences between images that have been evaluated and images that have not been evaluated.

In steps S243 to S249 it is possible to create a general purpose inference model having high versatility (dictionary), and guidance. However, a customized inference model may be obtained by further narrowing down requests. For example, an inference model is generated as a result of relearning by reforming training data, and the 1st inference model may be updated.

If the $1^{st}$ guidance has been created, next transmission etc. is performed, time and dates of learning is stored, and history management is performed (S251). Here, $1^{st}$ guidance that was created in step S249 is transmitted to the camera etc. Also, time and date (time and date information) at which the deep learning for creating this inference model are stored in the model DB section 130 or the DB management section 115. Also, various information such as creation conditions etc. for an inference population, conditions relating to population, information relating to training data, transmission destination of the inference model etc. that were used when the previous inference model was created are stored in the model DB section 130 or the DB management section 115 as history. As a result of managing history, it is possible to determine conditions such as timing for the next reform and relearning.

If history management etc. has been performed in step S251 it is next determined whether or not the number of likes in a specified category has increased (S253). For example, there may be cases where the number of likes increases for "photographs that receive evaluation from French girls in their 20s". In this step, the number of likes is monitored for each category, and determination is based on this number. If the result of this determination is that the number of likes in a specified category has not increased, processing returns to step S221 and the previous operations are executed.

If the result of determination in step S253 is that the number of likes in a specified category has increased, deep learning is performed for a specified field (S255). Here, image data population is restricted for the specified category in which a number of likes has increased, and deep learning is performed.

Once deep learning has been performed for the specified field, an $n^{th}$ inference model is created (S257). Strengths and weights etc. of neuron connections of the intermediate layers when deep learning has been completed are stored in the model DB section 130 as an $n^{th}$ model. It should be noted that a plurality of this inference model can be stored, and they are added sequentially in the order nth model, $n+1^{th}$ model, $n+2^{th}$ model, . . . .

If an $n^{th}$ model has been created, next $n^{th}$ guidance is created (S259). If the $n^{th}$ inference model has been created, advice so as to be able to shoot photographs with this $n^{th}$ model is created. As advice, various advice may be included, such as exposure control values, focal length, focal position, photographing lens direction etc. There may also be sample photographs that can be taken with the nth model.

If the $n^{th}$ guidance has been created, next, similarly to step S251, transmission etc. is performed, time and date of learning is stored, and history management is performed (S261). Here, $n^{th}$ guidance that was created in step S259 is transmitted to the camera etc. Also, time and date (time and date information) at which the deep learning for creating this inference model are stored in the model DB section 130 or the DB management section 115. Also, various information such as creation conditions etc. for an inference population, conditions relating to population, information relating to training data, transmission destination of the inference model etc. that were used when the previous inference model was created are stored in the model DB section 130 or the DB management section 115 as history.

The history management of step S261 relates to an inference model for a specified category object, and since this inference model was learned with training data based on a population created with conditions including specified and limited scene etc. as request conditions, the scene information etc. is preferably strictly specified. This specifying may be performed by the camera, but since there is a possibility that images will not have been classified at the external unit side by that specified dividing, differing from a versatile model it is more preferable to handle with a population creation method. Accordingly, it is preferable for history management here to have information so that it is possible to correctly create a population. For example, even if it is desired to set a scene such as a starry sky, there are cases where there is only a night scene in the external unit, and in order to resolve this type of inconsistency it would be best to further narrow down from night scene with characteristics of images, elevation angle and attached comments etc., and to do so it is better to perform history management. Also, due to the difficulty of population setting, since there is a high possibility of the previous learning failing, it is better to consider recommending update to the user more frequently. If history management etc. has been performed in step S261, processing returns to step S221 and the previously described operations are executed.

Returning to step S235, if the result of determination in this step is that there was no image adjustment, inclination determination for shooting conditions and taken images is performed (S271). In step S209 (FIG. 11B), shooting conditions that were collected by the condition section 1c1 and taken images that are stored in the taken image storage section 4d are transmitted to the external unit 20. In this step, the inclination determination section 113 determines inclination of shooting conditions of the camera 10 and shooting preferences of the user A.

Next, the training data is reformed (S273). Here, the training data is reformed in accordance with the changed shooting conditions and inclination of taken images that were determined in step S271. Specifically, conditions of image data to be extracted as training data for deep learning are changed.

Once the training data has been reformed, it is next determined whether or not there is an optimal model (S277). The inclination determination section 113 performs inclination determination in step S271. This inclination determination detects a like model that has a high degree of match to image feature input, feature extraction, and feature learning etc. of a like model such as the 1$^{st}$ like model 131, and this is made an optimal model. In this step it is determined whether or not there is an optimal model from within the model DB 130 that will be recommended to the user A.

If the result of determination in step S275 is that there is an optimal model, the optimal model is recommended (S277). Here, the model that was extracted in step S275 is set as the optimum model.

It is next determined whether or not there is a user request (S279). Here it is determined whether or not there has been an optimum model transmission request from the user A. It should be noted that in a case where shooting conditions etc. have been transmitted as a result of operation by the user A, it may automatically be determined that there is a user request.

If the result of determination in step S279 is that there is a user request, the former model and guidance are deleted (S281). Here, the former inference model and former guidance that were transmitted previously are deleted. The deletion of the former inference model etc., is because if energy-saving design, and heat generation problems, portability and space-saving accompanying the energy-saving design, are considered, the fact that there are countless inference models corresponding to all used scenes is inappropriate for the design and manufacture of the unit or device. However, if the device is in a field where the above-mentioned problems are permissible, it is possible to omit this deletion. Since there is a possibility of excessive judgments being mutually exclusive, a scheme may be implemented to lower priority of the inference model.

Next, the new model and new guidance are transmitted (S283). The optimum model that was set in step S277 (new model) and the guidance that was created based on this optimum model are transmitted to the camera 10. In the camera 10, the inference model and guidance that have been received are stored, as was described previously (refer to S213).

If the new model and new guidance have been transmitted, or if the result of determination in step S275 is that there is not an optimal model, or if the result of determination in step S279 is that there is not a user request, processing returns to step S221 and the previously described operations are executed.

In this way, with the third embodiment of the present invention in a case where the user has not adopted guidance and advice that have been inferred using an inference model, a request is issued to the external unit 20 service to create an inference model again (S183, S185, S193). This means that if shooting conditions, shooting preferences etc. have changed, the inference model is updated, and it is possible to perform guidance and advice based on an inference model that conforms to the user's preferences.

In the third embodiment of the present invention description has been given using FIG. 9A to FIG. 12B, but there is a close relationship with other embodiments, and there may be cases where the technical ideas that have been explained for other embodiments may be used directly or used in slightly modified form. Drawings of the other practical examples may be referred to for describing such sections being applied by sharing technical ideas. However, in order to avoid redundancy regarding duplicated sections that have been described in the other sections, repeated description will be omitted. Specifically, there may be cases where for this embodiment sections that are closely related to other embodiments are described with drawings other than FIG. 9~FIG. 12BΔ as substitutes. As one example, a drawing showing how inference results are verified, as in FIG. 1A, or FIG. 1B showing how an inference model is constructed, can be considered to provide the basis for all embodiments, and so repeated description is not given.

As has been described above, in each of the embodiments of the present invention, an inference model is set in an inference engine (inference section) (refer, for example, to S1 in FIG. 3, S81 in FIG. 6, and S213 in FIG. 11B), image data is input, output for performing guidance displayed to the user is obtained using the inference model (refer, for example, to S3 in FIG. 3, S55 in FIG. 6, and S177 in FIG. 11A), and guidance display is performed based on output of the inference engine (inference section) (refer, for example, to S9 in FIG. 3, S57 in Fig. &, and S181 in FIG. 11A). Determination is performed regarding update of an inference model, and based on the result of this determination, update of the inference model is requested to an external learning device, or determination as to whether or not update of the inference model is necessary is requested (refer, for example, to S15 and S19 in FIG. 3, S63 in FIG. 6, and S183 and S185 in FIG. 11A). This means that it is possible to update the inference model so that it is possible to perform appropriate guidance etc. even if conditions or the like change.

Also, with each of the embodiments of the present invention, control sections within units such as the camera 10 and the industrial endoscope 301, and programs that have been incorporated into the control sections, implement a computer-implemented method that is capable of collaboration with a social network system. Computer implemented software is computer that operates by being installed in an embedded device, and a computer-implemented method means a method that is implemented using this software.

Also, with a social network system there is a possibility of content items accordingly being posted (contributed) and there is a possibility of users connected to the system being added, and posted content items have a possibility of being subjected to quality assessment (including preferences) by users of the social network system. For example, as was described above, if images are uploaded to a social network there is a possibility that those images will be browsed by a third party, quality assessment such as "like" will be received from the third party, and it is possible to associate the images that have been uploaded and the quality assessment.

Also, with the computer-implemented method of this embodiment, in a case where an inference model for performing inference of quality assessment from characteristics of content items has been created with specified content items that have had quality assessment added, from among content items that have been posted, as training data, it is possible to determine that this inference model can no longer output originally intended inference results due to the fact that added content items have changed over time, and because of change over time in evaluation inclination of the content items (refer, for example, to S63 to S69 in FIG. 6, S111 to S121 in FIG. 7B, S151 to S165 in FIG. 8B, S185 in FIG. 11A, and S241 to S261 in FIG. 12B, etc.).

Also, when using a computer-implemented method that is capable of collaboration with the above described social network system, this computer-implemented method has steps for storing conditions, at the time that machine learning was performed using content items as training data, as history, and new training data is generated in accordance with this history that has been installed (refer, for example, to S153 in FIG. 8B). For example, a population may be created in accordance with conditions such as requests when deep learning was performed the previous time, and an inference model may be generated using this population.

Also, a computer-implemented method, that is capable of collaboration with the above described social network system, has steps for storing conditions as history, at the time of machine learning with content items being used by a specified user as training data (refer, for example, to S251 and S261 in FIG. 12B). For example, on generating an inference model, date and time, request (scene, evaluator etc.), population information etc. are stored as a history of conditions that were used for generating that inference model. By managing this history it is possible to use those conditions at the time of generating the next inference model.

Also, with a computer-implemented method that is capable of collaboration with a social network system, the social network system, there is a possibility of content items sometimes being posted (contributed), and a possibility of users connected to the system being added, and posted content items sometimes have a possibility of being subjected to quality assessment (including preferences) by users of the social network system. Also, the computer-implemented method has steps for storing conditions, at the time that a specified user performed machine learning using content items as training data (so as to resolve mismatches of categories between a camera and an external unit, for example), as history (refer, for example, to S261 in FIG. 12B).

Also a processor for a learning management device that manages specified learned models with the following steps: (1a) preparing an inference engine that is input with image data and acquires output for performing guidance display to a user using an inference model that has been specifically learned; (1b) inputting trial input images to the inference model that has been specifically learned, with conditions that have been assumed at the time of using the inference model that has been specifically learned; (1c) confirming whether or not output of the inference model that has been specifically learned constitutes specified guidance display; and (1d) determining whether or not it is necessary to update the inference model that has been specifically learned, based on the result of this confirmation.

It should be noted that in each of the preferred embodiments of the present invention, learning in the learning device has been the performing of deep learning, but this is not limiting, and may also be any learning that uses artificial intelligence, such as machine learning. Also, the learning device receives requests for generation of an inference model from the camera etc. However, this is not limiting, and the learning device may be built into the camera etc. and inference model may be generated while collaborating with an external database or the like. Further, an inference engine has been provided in the camera etc., and performs inference. However, this is not limiting and an inference engine may also be arranged within an external server in a cloud, and then the Internet etc. may be continuously connected to and display etc. performed based on inference results from the inference engine within the cloud.

Also, with each of the embodiments of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc., or a camera for a scientific instrument such as a microscope, a camera for mounting on a vehicle, a surveillance camera etc. In any event, it is possible to apply the present invention to a device that is capable of being input with image data, and is capable of directly or indirectly accessing an external image database Also, in recent years, it has become common to use artificial intelligence, such as being able to determine various evaluation criteria in one go, and it goes without saying that there may be improvements such as unifying each branch etc. of the flowcharts shown in this specification, and this is within the scope of the present invention. Regarding this type of control, as long as it is possible for the user to input whether or not something is good or bad, it is possible to customize the embodiments shown in this application in a way that is suitable to the user by learning the user's preferences.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A learning management device comprising:
an inference engine that is input with image data and acquires output for performing guidance display to a user using an inference model that has been specifically learned, and
a processor that confirms if there is a specified relationship between a trial input image and trial guidance display for this trial input image under conditions that have been assumed at the time of use, and that determines whether or not it is necessary to relearn the inference model that has been learned based on the result of this confirmation, wherein:
the processor
acquires newest training data, and
requests update of the inference model to an external learning device.

2. The learning management device of claim 1, wherein:
the processor further
calculates reliability of an inference model currently being used using the newest training data acquired, and
requests update of the inference model to the external learning device only if the reliability calculated is below a predetermined threshold.

3. A learning management device comprising:
an inference engine that is input with image data and acquires output for performing guidance display to a user using an inference model that has been specifically learned; and
a processor that confirms if there is a specified relationship between a trial input image and trial guidance display for this trial input image under conditions that have been assumed at the time of use, and that determines whether or not it is necessary to relearn the inference model that has been learned based on the result of this confirmation,
wherein an external learning device performs confirmation as to whether or not an update of the inference model is necessary, and the processor performs determination based on confirmation result from the external device.

4. The learning management device of claim 3, wherein:
the processor, if a given time has elapsed after requesting update of the inference model to the external learning device, requests update of the inference model to the external learning device or requests determination as to whether or not update to the inference model is necessary.

5. The learning management device of claim 3, wherein:
the processor monitors change in current state, and if current state changes requests update of the inference model to the external learning device.

6. The learning management device of claim 5, wherein:
the processor determines that current state has changed if a user has not adopted the guidance display and no change has been reflected in the user's operation.

7. The learning management device of claim 3, wherein:
the processor regularly performs confirmation of whether or not update of the inference model is necessary.

8. A learning management method comprising:
setting an inference model in an inference engine;
inputting image data and acquiring output for performing guidance display to a user using an inference model that has been specifically learned;
confirming if there is a specified relationship between a trial input image and trial guidance display for this trial input image under conditions that have been assumed at the time of use, and determining whether or not it is necessary to again learn the inference model that has been learned based on the result of this confirmation;
acquiring newest training data; and
requesting update of the inference model to an external learning device.

9. The learning management method of claim 8 further comprising:
calculating reliability of an inference model currently being used using the newest training data acquired; and
requesting update of the inference model to the external learning device only if the reliability calculated is below a predetermined threshold.

10. An imaging device, comprising:
an imaging sensor that forms a subject image and outputs image data;
an interface that is input with an inference model;
an inference engine that is input with image data and acquires output for performing guidance display to a user using the inference model;
a display that performs the guidance display based on output of the inference engine; and
a processor that confirms update of the inference model, and based on a result of this confirmation, requests update of the inference model to an external learning device, or requests determination as to whether or not update of the inference model is required.

11. The imaging device of claim 10, wherein
the processor acquires newest training data, calculates reliability of an inference model currently being used using this newest training data, and if this reliability is low requests update of the inference model to the external learning device.

12. The imaging device of claim 10, wherein
the processor, if a given time has elapsed after requesting update of the inference model to the external learning device, requests update of the inference model to the external learning device or requests determination as to whether or not update to the inference model is necessary.

13. The imaging device of claim 10, wherein
the processor monitors change in current state, and if current state changes requests update of the inference model to the external learning device.

14. The imaging device of claim 13, wherein:
the processor determines that current state has changed if a user has not adopted the guidance display and no change has been reflected in the user's operation.

15. The imaging device of claim 10, wherein
the processor regularly performs confirmation of whether or not update of the inference model is necessary.

16. The imaging device of claim 10, wherein
the external device performs confirmation as to whether or not update of the inference model is necessary, and the processor performs determination based on confirmation result from the external device.

17. A learning management method comprising:
setting an inference model in an inference engine;
inputting image data and acquiring output for performing guidance display to a user using an inference model that has been specifically learned; and
confirming if there is a specified relationship between a trial input image and trial guidance display for this trial input image under conditions that have been assumed at the time of use, and determining whether or not it is necessary to again learn the inference model that has been learned based on the result of this confirmation,
wherein an external learning device performs confirmation as to whether or not an update of the inference model is necessary, and the processor performs determination based on confirmation result from the external device.

18. The learning management method of claim 17, further comprising:
if a given time has elapsed after requesting update of the inference model to the external learning device, requesting update of the inference model to the external learning device, or requesting determination as to whether or not update to the inference model is necessary.

19. The learning management method of claim 17, further comprising:
monitoring change in current state, and, if current state changes, requesting update of the inference model to the external learning device.

20. The learning management method of claim 17, further comprising:
determining that current state has changed if a user has not adopted the guidance display and no change has been reflected in the user's operation.

21. The learning management method of claim 17, further comprising:
performing confirmation of whether or not update of the inference model is necessary.

\* \* \* \* \*